United States Patent [19]

Kumanoya et al.

[11] Patent Number: 4,961,007
[45] Date of Patent: Oct. 2, 1990

[54] SUBSTRATE BIAS POTENTIAL GENERATOR OF A SEMICONDUCTOR INTEGRATED CIRCUIT DEVICE AND A GENERATING METHOD THEREFOR

[75] Inventors: Masaki Kumanoya; Yasuhiro Konishi; Katsumi Dosaka; Takahiro Komatsu; Youichi Tobita, all of Hyogo, Japan

[73] Assignee: Mitsubishi Denki Kabushiki Kaisha, Tokyo, Japan

[21] Appl. No.: 337,218

[22] Filed: Apr. 12, 1989

[30] Foreign Application Priority Data

Dec. 8, 1988 [JP] Japan .................................. 63-312415

[51] Int. Cl.$^5$ .................................................. H03K 3/01
[52] U.S. Cl. .............................. 307/296.2; 307/296.8; 323/313; 323/314; 363/60
[58] Field of Search ............... 307/296.2, 296.8, 279, 307/304; 323/313, 314; 363/60; 365/189.09

[56] References Cited

U.S. PATENT DOCUMENTS

| | | | |
|---|---|---|---|
| 3,869,659 | 3/1975 | Doong et al. ....................... | 363/60 |
| 4,229,667 | 10/1980 | Heimbighy et al. ................ | 307/304 |
| 4,356,412 | 10/1982 | Moench et al. ..................... | 307/304 |
| 4,460,835 | 7/1984 | Masuoka ............................. | 307/304 |
| 4,471,290 | 9/1984 | Yamaguchi ......................... | 307/304 |
| 4,631,421 | 12/1986 | Inove et al. ........................ | 307/296.2 |
| 4,656,369 | 4/1987 | Lou .................................... | 307/296.2 |
| 4,742,250 | 5/1988 | Tobita ................................ | 307/304 |
| 4,780,854 | 10/1988 | Watanabe et al. ................. | 307/296.8 |
| 4,794,278 | 12/1988 | Vajdic ................................. | 307/351 |
| 4,843,256 | 6/1989 | Scade et al. ....................... | 307/296.2 |
| 4,843,258 | 6/1989 | Miyawaki et al. ................. | 307/296.2 |

FOREIGN PATENT DOCUMENTS 8001021 5/1980 Japan .................................. 307/296.2
61-59688 3/1986 Japan .

OTHER PUBLICATIONS

IBM Tech. Discl. Bull.—"Low Power Substrate Voltage Generator"—5—86—p. 5233.
R. Hori, "A 20 ns Static Column 1 Mb DRAM in CMOS Technology", 1985 IEEE International Solid-State Circuits Conference, Digest of Technical Papers (Feb. 15, 1985), pp. 254–255.

Primary Examiner—Stanley D. Miller
Assistant Examiner—T. Cunningham
Attorney, Agent, or Firm—Lowe, Price, LeBlanc, Becker & Shur

[57] ABSTRACT

A substrate bias potential generator for biasing a semiconductor substrate to a predetermined potential includes first and second substrate bias generating circuits which operate alternatively according to the potential of the substrate, whereby consumption of power in the substrate bias potential generator is reduced. The alternative operation of the bias generating circuits each activated by a pulse signal train is performed by using a first insulated gate transistor having a gate electrode connected to the semiconductor substrate, a second insulated gate transistor having a gate electrode for receiving the reference potential, an amplifier for differentially amplifying outputs of the first and second insulated gate transistors, an insulated gate transistor for charging an output of the amplifier to a predetermined potential when the amplifier is activated, and a circuit for transmitting the output of the differential amplifier to the first and second bias potential generating circuits. The differential amplifier is activated in response to an activation signal of a pulse train whereby an activation signal corresponding to the pulse train is transmitted to either substrate bias potential generating circuit.

17 Claims, 14 Drawing Sheets

SUBSTRATE BIAS POTENTIAL GENERATOR OF A SEMICONDUCTOR INTEGRATED CIRCUIT DEVICE AND A GENERATING METHOD THEREFOR

BACKGROUND OF THE INVENTION

1. Field of the Invention

The present invention relates to a substrate bias potential generator of a semiconductor integrated circuit device and a method therefor and particularly to a construction of a substrate bias potential generator and a method of generating the bias potential, which makes it possible to generate a substrate bias voltage of a desired level reliably with low consumption of power to apply the bias voltage to a semiconductor substrate in a dynamic semiconductor memory device such as a dynamic random access memory (DRAM).

2. Description of the Background Art

Recently, personal computers have become widely popular and used in various fields. Among such personal computers, portable personal computers called lap-top type computers have been lately in great demand. Generally, a portable personal computer uses a battery as an operation power supply and therefore a memory device incorporated therein needs to have low consumption of power. Such a memory device of low consumption of power is for example a dynamic type semiconductor memory device or a static type semiconductor memory device.

Normally, in a semiconductor integrated circuit device including insulated gate field effect transistors (referred to hereinafter as MOSFETs), a substrate bias potential generating circuit is generally provided as shown in FIG. 1 for example.

Referring to FIG. 1, a semiconductor integrated circuit device 500 has MOSFETs and it comprises a function circuit 110 for preforming a predetermined function, and a substrate bias potential generating circuit 120 for generating a predetermined potential $V_{BB}$ to apply it to a semiconductor substrate 130. Application of the substrate bias potential $V_{BB}$ makes it possible to reduce parasitic capacitance or the like formed between the semiconductor substrate 130 and the circuit elements such as MOSFETs included in the function circuit 110. In the following, the effect of the substrate bias potential $V_{BB}$ will be briefly described with reference to FIG. 2.

FIG. 2 shows a sectional structure of a part of the function circuit shown in FIG. 1. In FIG. 2, one MOSFET and an impurity region providing an interconnection region or the like are typically shown. The MOSFET is formed in a predetermined region of a surface of the p type semiconductor substrate 130 and it includes n+impurity regions 131 and 132 to be source and drain regions and a gate electrode 133. A gate insulating film 134 is formed between the gate electrode 133 and the p type semiconductor substrate 130. A channel is formed between the source and drain regions 131 and 132 according to the voltage applied to the gate electrode 133. For example, an n+impurity region 135 to be a connection region is formed on the surface of the semiconductor substrate 130, with a spacing from the impurity region 131. A signal line 136 is provided through a thick field insulating film 137 on the surface of the semiconductor substrate 130 between the impurity regions 131 and 135. A negative bias potential $V_{BB}$ is applied to the p type semiconductor substrate 130. The application of the negative potential $V_{BB}$ makes it possible to reduce a junction capacitance formed by PN junction between the source and drain regions 131 and 132 and the semiconductor substrate 130, as well as a junction capacitance formed by PN junction between the semiconductor connection region 135 and the semiconductor substrate 130. The reduction of the junction capacitances causes a decrease in parasitic capacitance limiting operation speed and thus the integrated circuit device can perform high speed operation.

If a connection 136 for transmitting a signal of an operation power supply voltage level is provided on the field insulating film 137, a channel may be formed between the impurity regions 131 and 135 due to the voltage of the signal line 136, causing formation of a parasitic MOSFET. However, a threshold voltage of the parasitic MOSFET becomes large due to the substrate bias potential $V_{BB}$ and accordingly it is possible to prevent operation of the parasitic MOSFET, which assures reliable operation of the integrated circuit device.

In addition, an increasing rate of a threshold voltage due to the substrate bias effect of the MOSFET becomes small according to increase of an absolute value of the bias voltage $V_{BB}$ as well known. Accordingly, even if deviations in characteristics of the circuit elements occur dependent on changes of manufacturing parameters at the time of manufacturing the integrated circuits, it is possible to set the threshold voltage of MOSFETs having such deviations in characteristics to a value of a relatively narrow range by applying the substrate bias potential $V_{BB}$, and thus the semiconductor integrate circuit device can be reliably operated.

Furthermore, in the case of transfer gate transistors having memory cell capacitors connected to bit lines in memory cells of DRAMs as shown in FIG. 2, the threshold voltage is increased in the positive direction by the substrate bias potential $V_{BB}$ and thus leakage current in the transfer gate transistor is decreased. As a result of the decrease of the leakage current in the transfer gate transistor, the charge in the memory cell capacitor can be held for a relatively long period and stable operation of the memory cells is ensured.

The substrate bias generating circuit 120 generates the bias potential $V_{BB}$ as a result of charge pump operation utilizing the capacitor, as will be clear from the below explanation. The substrate bias potential $V_{BB}$ is smoothed by a parasitic capacitance and a stray capacitance or the like existing between the semiconductor substrate 130 to which the bias potential is applied and the power supply connection, the semiconductor impurity regions or the like, so that it is maintained at a fixed level.

The above described substrate bias potential $V_{BB}$ is decreased due to leakage current caused between the semiconductor substrate 130 and the source and drain regions 131 and 132 of the MOSFET or the connection region 135. In other words, the bias potential applied to the semiconductor substrate 132 becomes low. The leakage current in the semiconductor substrate 130 is not always constant and it is affected by the operation of the functional circuit components in the integrated circuit device. The hole current applied to the substrate is relatively small if the MOSFET is in a constant state, that is, held in the on or off state. However, if the MOSFET operates and switching operation is carried out, the positive hole current which is generated in association with circuit operation and flows into the substrate increases accordingly. As a result of generation of the hole current, the absolute value of the substrate bias potential $V_{BB}$ becomes small. Consequently, in a conventional semiconductor integrated circuit device in general, the substrate bias potential generating circuit is set to have a relatively large current supply capability in order to maintain the substrate bias potential $V_{BB}$ at the fixed level even if the positive hole current which is generated in associated with circuit operation and flows into the substrate is increased.

In the case of a dynamic type semiconductor memory device of such semiconductor integrated circuit devices, if it is used for a portable personal computer or the like as described above, it is designed to have low consumption of power. In general, in a dynamic semiconductor memory device, its consumption of power is smallest in standby state. In such a standby (in a non-selected state of the semiconductor memory device), consumption of power in a circuit for generating the substrate bias potential $V_{BB}$ occupies most of the total consumption of power and in order to realize a semiconductor memory device with ultralow standby current, it is necessary to reduce consumption of power in a substrate bias potential generating circuit which operates even in the standby mode.

A method for reducing consumption of power in a substrate bias potential generating circuit as described above is disclosed for example in Japanese Patent Laying-Open Gazette No. 59688/1986, in which two substrate bias potential generating circuits having different bias capabilities (current supply capabilities) are provided and the substrate bias potential generating circuit having the lower capability is constantly operated and the other substrate bias potential generating circuit having the higher capability is intermittently operated dependent on the potential applied to the semiconductor substrate or the operation state of the memory device.

FIG. 3 is a schematic diagram showing the entire construction of a semiconductor memory device comprising a conventional substrate bias potential generating circuit. Referring to FIG. 3, the semiconductor memory device comprises a memory cell array 6 for storing information, and an address buffer 4 for generating an internal address signal upon receipt of external address signals A0 to An. The internal address signal from the address buffer 4 is supplied to the memory cell array 6. The memory cell array 6 decodes the internal address signal in a decoder not shown and selects one or more memory cells in response to the decode signal therefrom. The memory cell array 6 has a matrix arrangement in which generally memory cells of a 1-transistor 1-capacitor type are arranged in rows and columns.

Normally in a dynamic type semiconductor memory device, a row address for designating a row and a column address for designating a column of the memory cell array 6 are multiplexed in a time divisional manner and supplied to the address buffer 4. Therefore, in order to apply timing for accepting the row address and the column address by the address buffer 4, there are an RAS buffer 3 for generating an internal row selection control signal upon receipt of an externally applied row address strobe signal $\overline{RAS}$ and a CAS buffer 5 for generating an internal column selection control signal upon receipt of an external column address strobe signal $\overline{CAS}$. The signal $\overline{RAS}$ provides timing for accepting the row address signals A0 to An by the address buffer 4 and defines a memory cycle of the semiconductor memory device. More specifically, when the signal $\overline{RAS}$ falls to low (L) level, the storage operation of the semiconductor memory device is started and accessing to the memory cell is effected during the period of L level of the signal $\overline{RAS}$. In addition, the signal $\overline{RAS}$ provides timing for controlling operation of circuits associated with ro selection included in the semiconductor memory device.

The signal $\overline{CAS}$ applies timing with which the address buffer 4 accepts the column address signal and it also applies operation timing to the circuit related with column selection operation in the semiconductor memory device.

First and second substrate bias potential generating circuits 1 and 2 are provided to apply the bias potential $V_{BB}$ of the predetermined level to the semiconductor substrate where the semiconductor memory device is formed. The first substrate bias potential generating circuit 1 has a relatively small current supply capability (bias capability) and it constantly operates to generate the substrate bias potential to supply to the semiconductor substrate.

The second substrate bias potential generating circuit 2 operates when the bias potential applied to the semiconductor substrate becomes smaller than the predetermined level (that is, the bias becomes low) in an operation of the memory device, and it applies the bias potential of the predetermined level to the semiconductor substrate. The second substrate bias potential generating circuit has a relatively large current supply capability (bias capability).

FIG. 4 shows an example of specific constructions of the first and second substrate bias potential generating circuits 1 and 2 shown in FIG. 3. Referring to FIG. 4, the first substrate bias potential generating circuit 1 comprises a ring oscillator 11, inverters 12 and 12,, a capacitor 13 and n channel MOSFETs 14 and 15. The ring oscillator 11 is formed by an odd number of stages of inverters for example and its output is fed back to its input to generate a pulse signal of a predetermined frequency. The inverters 12 and 12' wave-shape and amplify the output of the ring oscillator 11 and provide an output. The capacitor 13 couples capacitively the output of the inverter 12 to a node $N_A$ and carries out charge pump operation for generating the bias potential by charging and discharging operation thereof.

The MOSFET 14 has its gate and drain connected to the node $N_A$ and its source connected to the ground potential. The source and the drain of the MOSFETs are defined by polarity of the voltage applied thereto. In the following, the respective nodes are simply defined as the source and drain for convenience of explanation. The MOSFET 14 has a threshold voltage $V_{T2}$ and clamps the potential of the node $N_A$ to the threshold voltage.

The MOSFET 15 has its drain connected to the node $N_A$ and its gate and source connected to the bias potential output terminal 9. The MOSFET 15 has a threshold voltage $V_{T1}$ and clamps the potential of the node $N_A$ to $V_{BB}-V_{T1}$.

In the case of a construction in which the substrate bias potential is generated in response to the pulse signal from the ring oscillator 11, the current supply capability of the substrate bias potential generating circuit 1 is defined by the oscillation frequency of the ring oscillator 11, the capacitance value of the charge pump capacitor 13 and the conductance of the MOSFET 15. In other words, the charge amount injected into the semiconductor substrate 10 in response to one oscillation output pulse becomes large as the capacitance value of the capacitor 13 becomes large. The number of injections of charge into the semiconductor substrate per unit time becomes large as the oscillation frequency of the ring oscillator 11 becomes large. The substrate bias potential generating circuit 1 which constantly operates is structured to have low power consumption characteristics while maintaining the relatively small current supply capability. More specifically, the oscillation frequency of the ring oscillator 11 is made to have a relatively small value by setting the number of stages of the inverter circuit of the ring oscillator 11 to a suitable value and setting the signal delay characteristic in each inverter circuit suitably. The capacitance value of the capacitor 13 is also set to a relatively small value.

Consumption of power in the ring oscillator 11 is proportional to its oscillation frequency. More specifically, the operation current or consumption current of the inverter circuit (of the CMOS structure) of the ring oscillator 11 is proportional to so-called transient current required for charging and discharging of load capacitance (formed by a connection capacitance or an input capacitance of the inverter circuit of the subsequent stage, or the like) coupled to the output of each inverter circuit, in the same manner as in the case of a CMOS inverter circuit as well known. Accordingly, in a still state in which the input or output of each inverter circuit is fixed to high (H) level or low (L) level, the consumption of current in the ring oscillator 11 is substantially 0. Since the transient current of each inverter circuit is proportional to each operation frequency during oscillation operation, the consumption of power of the ring oscillator 11 having the small oscillation frequency is decreased accordingly. The current supply capability of the inverter 12 as an output buffer for driving rectifier circuit (the capacitor 13, the MOSFETs 14 and 15; analog circuit) is relatively small since the capacitance value of the capacitor 13 is relatively small.

The second substrate bias potential generating circuit 2 which operates intermittently dependent on the potential of the semiconductor substrate or the operation state of the memory device comprises: a ring oscillator 21 which carries out oscillation operation intermittently; inverters 23 and 24 for wave-shaping and amplifying the output of the ring oscillator 21; a charge pump rectifying circuit for rectifying the output of the inverter 24 and applying the rectified output to the semiconductor substrate; a substrate bias potential generating circuit 28 for detecting the potential of the semiconductor substrate and controlling the oscillation operation of the ring oscillator 21 according to the detected potential; and a NOR gate 29. The ring oscillator 21 includes inverters Il and I2 and a NOR gate 22. The number of stages of inverters of the ring oscillator 21 is selected suitably according to the oscillation frequency and the delay characteristics. In this case, for simplification of the illustration, an example of a ring oscillator including three inverters, i.e., two inverters Il and I2 and one NOR gate 22 is shown. The output of the NOR gate 22 is fed back to the input of the inverter Il and is transmitted to the input of the inverter 23. The NOR gate 22 has its one input receiving the output of the inverter I2 and its other input receiving a control signal NC from the NOR gate 29.

Inverters 23 and 24, a capacitor 25 and n channel MOSFETs 26 and 27 are provided to perform the same function as that of the first substrate bias potential generating circuit. The capacitor 25 carries out charge pump operation according to the output of the inverter 24, and the n channel MOSFETs 26 and 27 clamp the potential of the node $N_P$ at a predetermined potential. The MOSFET 26 has a threshold voltage $V_{T3}$ and the MOSFET 27 has a threshold voltage $V_{T4}$.

The substrate potential detecting circuit 28 is connected to the semiconductor substrate through a bias potential output terminal 9 and it determines whether the potential of the semiconductor substrate is a predetermined value or not and outputs a signal $N_D$ according to the result. The signal $N_D$ is set to H level when the potential of the semiconductor substrate is smaller than a predetermined level in terms of an absolute value to cause the substrate bias potential to be low, and it is set to L level when the substrate potential is larger than the predetermined level in terms of an absolute value.

The NOR gate 29 has its one input terminal for receiving a signal RAS indicating the operation state of the semiconductor memory device from the RAS buffer 3 and its other input terminal for receiving the control signal $N_D$ from the substrate potential detecting circuit 28 to output a control signal $N_C$. Accordingly, the control signal $N_C$ is set to L level if either the signal RAS or the signal $N_D$ rises to H level, whereby the ring oscillator 21 is activated to perform oscillating operation. When the control signal $N_C$ is at H level, the output of NOR gate 22 is fixed to L level and accordingly the ring oscillator 21 does not perform oscillating operation and no bias potential is provided from the substrate bias potential generating circuit 2. As described above, the bias capability (the current supply capability) of the substrate bias potential generating circuit 2 is defined by the oscillation frequency of the ring oscillator 21 and the capacitance value of the charge pump capacitor 25. Since the bias capability of the substrate bias potential generating circuit 2 is relatively large, the oscillation frequency of the ring oscillator 21 and the capacitance value of the capacitor 25 are respectively large.

FIG. 5 is a diagram showing an example of a construction of the substrate bias potential detecting circuit shown in FIG. 4. Referring to FIG. 5, the substrate potential detecting circuit 28 comprises a p channel MOSFET 281 and n channel MOSFETs 282 and 283, which are connected in series between the operation power supply potential Vcc and the substrate potential $V_{BB}$. The p channel MOSFET 281 has its drain connected to the power supply potential Vcc, its gate connected to the ground potential and its source connected to a node N1. The n channel MOSFET 282 has its drain connected to the node N1, its gate connected to the ground potential and its source connected to a node N2. The n channel MOSFET 283 has its drain and gate connected to the node N2 and its source connected to the substrate potential $V_{BB}$. The MOSFETs 282 and 283 have threshold voltages $V_{T5}$ and $V_{T6}$, respectively. Inverters 284 and 285 are provided to wave-shape and amplify the output of the node N1. The output of the inverter 285 is the signal $N_D$ indicating the result of detection of the substrate potential. The p channel MOSFET 281 is constantly in the on state since a signal of the ground potential level is applied to its gate. If the substrate potential $V_{BB}$ is $$V_{BB} > -(V_{T5} + V_{T6}),$$

the MOSFET 282 is in the non-conductive state and accordingly the potential level of the node N1 is H level. Since the potential level of the node N1 is outputted through the inverters 284 and 285, the output signal $N_T$ in this case is at H level.

If the substrate potential $V_{BB}$ is $$V_{BB} \leq -(V_{T5}+V_{T6}),$$

the N channel MOSFET 282 is in the conductive state. In this case, if a ratio of the sizes of the MOSFETs 282 and 282 is suitably selected and the on resistance values thereof are set to a suitable ratio, the level of the node N1 can be set to a level determined to be L by the inverter 284. The control signal $N_D$ in this case is at L level.

In the substrate potential detecting circuit 28, if the MOSFETs 282 and 283 are in the on state, current flows from the power supply potential Vcc to the substrate bias potential $V_{BB}$. More specifically, if the semiconductor substrate is of the p type, the substrate bias potential $V_{BB}$ is set to a negative potential and, also if the semiconductor substrate is in the n type, the bias potential $V_{BB}$ is set to a positive value smaller than the operation power supply potential Vcc. In such a case, when the MOSFETs 282 and 283 are both in the on state, current flows from the operation power supply potential Vcc to the semiconductor substrate, with the result that the bias potential level of the semiconductor substrate becomes small in terms of an absolute value, making it impossible to carry out detection of the substrate bias potential correctly. Accordingly, in order to minimize the current flowing to the semiconductor substrate through the substrate potential detecting circuit, the conductance of the MOSFET 281 is set to a very small value, so that only small current flows in the MOSFET 282.

FIG. 6 is a waveform diagram showing operation of the substrate bias potential generating circuit shown in FIGS. 4 and 5. Referring to FIG. 6, the signal $\overline{RAS}$ indicates a row address strobe signal applied to the RAS buffer 3 of FIG. 3, indicating whether the semiconductor memory device is selected to be in operation state or not. $V_A$ and $V_B$ in (b) and (c) of FIG. 6 indicate potentials of nodes $N_A$ and $N_B$ in FIG. 4, respectively. In the following, operation of the conventional substrate bias potential generation circuit will be described with reference to FIGS. 3 to 6.

First, operation of the first substrate bias potential generating circuit 1 will be described. When the pulse signal from the ring oscillator 11 rises to the power supply potential Vcc level and the output level of the inverter 12 is accordingly raised to the power supply potential Vcc, the potential of the node $N_A$ tends to be raised to the power supply potential Vcc due to the capacitance coupling of the capacitance 13. However, when the potential of the node $N_A$ rises to the level of the threshold voltage $V_{T2}$ of the MOSFET 14, the MOSFET 14 is conducted and further increase of the voltage is suppressed. As a result, the potential of the node $N_A$ is maintained at the level $V_{T2}$. In the meantime, the capacitor 13 is charged by the output of the inverter 12. The MOSFET 15 is in the off state.

When the output of the ring oscillator 11 is lowered to the ground potential level and the output of the inverter 12 is accordingly lowered to the ground potential level, the potential of the node $N_A$ tends to be lowered to the level $(V_{T2}-Vcc)$ due to the capacitance coupling of the capacitor 13. However, when the potential of the node $N_A$ becomes smaller than the potential $(V_{BB}-V_{T1})$ obtained by subtraction of the threshold voltage $V_{T1}$ of the MOSFET 15 from the substrate potential $V_{BB}$, the MOSFET 15 is turned on and electrons are injected into the substrate through the MOSFET 15 in the on state, causing the potential of the substrate to be lowered. As a result, the potential of the node $N_A$ becomes a potential according to the substrate potential.

By repeating the above described operation, electrons are injected into the semiconductor substrate from the terminal 9 through the charge pump capacitor 13, to lower the substrate potential. The degree of lowering of the substrate potential caused by one electron injection operation, namely, one pulse from the ring oscillator 11 is determined by a ratio between the capacitance of the capacitance 13 and the load capacitance of the semiconductor substrate. By repeating the above described operation several times, the potential of the node $N_A$ changes as oscillation between the potential $(V_{T2}-Vcc)$ and the potential $V_{BB}$ of the substrate finally becomes close to the potential $(V_{T2}-Vcc+V_{T1})$. More specifically, the first substrate bias potential potential generating circuit 1 applies the bias potential determined by the threshold voltages of the two MOSFETs 14 and 15 and the operation power supply potential.

Next, operation of the second substrate bias potential generating circuit 2 will be described. Now let us assume a case in which the semiconductor memory device is selected and is in operation state. In this case, the signal $\overline{RAS}$ falls to L level and the signal RAS rises to H level. As a result, the NOR gate 29 outputs the control signal $N_C$ of L level independent of the level of the signal $N_D$ indicating the detection result from the substrate potential detecting circuit 28. Since the NOR gate 22 receives the signal of L level at its other input terminal, it operates as an inverter and as a result the ring oscillator 21 starts oscillation operation. The operation of the capacitor 25 and the MOSFETs 26 and 27 is the same as the operation of the capacitor 13 and MOSFETs 14 and 15 included in the first substrate bias potential generating circuit 1. Thus, the charge pump operation of the capacitor 25 and the clamp operation of the MOSFETs 26 an 27 cause injection of electrons into the semiconductor substrate through the terminal 9. Since the bias capability of the second substrate bias potential generating circuit is larger than that of the first substrate bias potential generating circuit, compensation is made for decrease of the value of the substrate bias potential $V_{BB}$ in terms of the absolute value due to the substrate current of a considerable amount flowing in the operation of the device, whereby the substrate potential is maintained at the predetermined level.

Next, let us assume a case in which the signal $\overline{RAS}$ is at H level and the signal $N_D$ outputted from the substrate potential detecting circuit 28 is at L level. More specifically, the semiconductor memory device is in a non selected state such as a standby state and the potential of the semiconductor substrate is biased to a predetermined biased value. In this case, the signals applied to the two inputs of NOR gate 29 are both at L level and the output signal $N_C$ from the NOR gate 29 is at H level. As a result, the NOR gate 22 receives the signal of H level at its other input and the output therefrom is at a fixed level of L level. Consequently, the ring oscillator 21 does not carry out oscillating operation.

If the signal $\overline{RAS}$ is at H level and leakage current flows in the semiconductor substrate due to generation of holes by any cause such as impact ionization to cause the bias potential of the semiconductor substrate to be low (namely, the substrate bias potential $V_{BB}$ to be smaller in terms of the absolute value), the output signal $N_D$ from the substrate potential detecting circuit 28 rises to H level. As a result, the output signal $N_C$ from the NOR gate 29 falls to L level and the NOR gate 22 operates as an inverter. Consequently, the ring oscillator 21 starts oscillating operation, whereby the potential of the semiconductor substrate is lowered to a predetermined potential level rapidly by its large bias capability.

As described above, in the conventional substrate bias potential generating circuit, two bias potential generating circuits having different bias capabilities are provided and the substrate bias potential generating circuit having the smaller bias capability is constantly operated, while the substrate bias potential generating circuit having the larger bias capability is operated only in the case in which the bias potential of the substrate becomes small in terms of the absolute value and the bias becomes low, thereby to rapidly lower the substrate potential $V_{BB}$. Thus, consumption of power in the substrate bias potential generating circuits can be reduced.

However, in the above described construction, if the semiconductor memory device, which is a semiconductor integrated circuit device, is selected to be in operation state, the two substrate bias potential generating circuits both operate, resulting in increase of consumption of power in those substrate bias potential generating circuits.

The construction of the substrate potential detecting circuit enabling the substrate bias potential generating circuit to operate intermittently is the construction as shown in FIG. 5, in which the potential of the substrate is detected by utilizing the threshold voltages of the MOSFETs. Accordingly, in the case of the construction in which the MOSFETs are connected in series between the operation power supply potential Vcc and the semiconductor substrate potential $V_{BB}$, when the substrate bias potential $V_{BB}$ becomes larger than the predetermined potential in terms of the absolute value and the MOSFETs 282 and 283 are turned on, current flows from the operation power supply Vcc to the semiconductor substrate, causing the bias of the semiconductor substrate to be low. As a result, the substrate potential detecting circuit itself causes change in the substrate bias potential and the substrate potential cannot be detected correctly. More specifically, if the bias of the semiconductor substrate becomes low, the second substrate potential generating circuit having the larger bias capability is operated; however, in this case, when the bias potential of the semiconductor substrate attains the predetermined value, the substrate potential detecting circuit provides a path enabling current to flow into the semiconductor substrate, causing the bias of the semiconductor substrate to be shallow and as a result the semiconductor bias potential generating circuit having the larger bias capability is operated unnecessarily. Thus, the substrate potential cannot be detected correctly and consumption of power cannot be reduced.

SUMMARY OF THE INVENTION

An object of the present invention is to provide a substrate bias potential generator having an improvement in consumption of power.

Another object of the present invention is to provide a substrate bias potential generator which is capable of biasing a semiconductor substrate to a predetermined potential level with low consumption of power correctly in response to the potential of the semiconductor substrate.

A further object of the present invention is to provide a substrate bias potential generating circuit with low consumption of power which comprises a substrate potential detector capable of correctly detecting a potential of a semiconductor substrate without exerting adverse effect on the potential of the semiconductor substrate and operates in response to an output of the substrate potential detector.

A further object of the present invention is to provide an improvement in a method of generating a bias potential of a substrate.

A substrate bias potential generator according to the present invention includes: a semiconductor substrate having a surface on which a semiconductor integrated circuit device is formed; first and second potential generating circuits formed on the semiconductor substrate and having different current supply capabilities an applying bias potentials to the semiconductor substrate; an element connected to the semiconductor substrate through an input having a high input impedance for detecting the potential of the semiconductor substrate; and a circuitry for selectively activating only either one or the other, not both, of the first and second potential generating circuits in response to an output of the semiconductor substrate potential detecting element. The selective activation circuitry includes a device for generating an activation signal, a device for generating a comparison reference potential, a device for comparing an output of the substrate potential detecting device and an output of the reference potential generating device, and a device for transmitting the output of the activation signal generating device to either one or the other, not both, of the first and second potential generating circuits in response to the output of the comparing device, thereby activating either one or the other, not both, of the first and second potential generating circuits.

The substrate bias potential generator according to the present invention is provided with the two substrate bias potential generating circuit having different bias capabilities (current supply capabilities) and either one or the other, not both, of the two substrate bias potential generating circuits is selectively operated according to the potential of the semiconductor substrate. Accordingly, only either circuit is always operated and the semiconductor substrate can be biased to a predetermined potential level with low consumption of current.

In addition, the substrate potential detecting element for enabling selector of the two bias potential generating circuit is connected to the semiconductor substrate through the input having a high input impedance and, accordingly, the substrate potential detecting element itself does not exert any adverse effect such as flow of current in the semiconductor substrate. Thus, the potential of the substrate can be detected reliably and only either one or the other, not both, of the substrate bias potential generating circuits can be operated correctly according to the potential of the substrate.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 7:
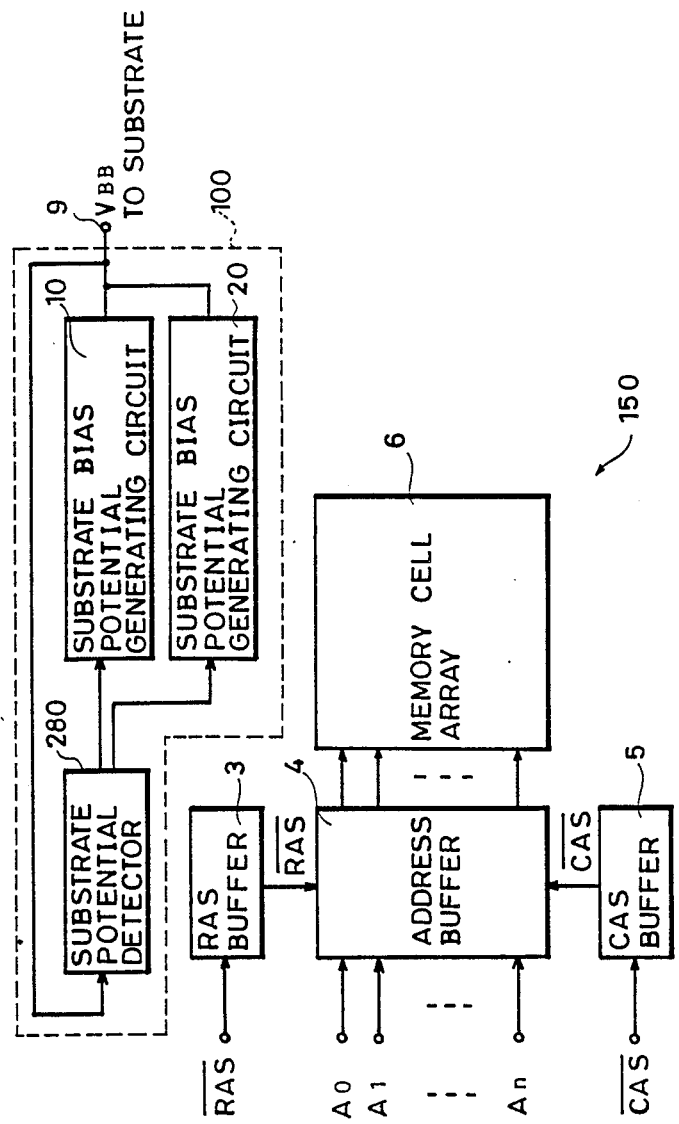
FIG. 7 is a diagram showing a general construction of a semiconductor memory device comprising a substrate bias potential generator according to an embodiment of the present invention.

FIG. 7 is a diagram schematically showing a construction of a main part of a semiconductor memory device according to an embodiment of the invention.

Referring to FIG. 7, the semiconductor memory device comprises: a memory cell array 6 for storing information; an RAS buffer 3 for receiving an externally applied row address strobe signal $\overline{RAS}$ and generating an internal operation timing signal; an address buffer 4 for receiving externally applied address signals A0 to An; and a CAS buffer 5 for receiving an externally applied column address strobe signal $\overline{CAS}$. A row address signal and a column address signal are multiplexed in a time-divisional manner and supplied to the address buffer 4. The internal control signals $\overline{RAS}$ and $\overline{CAS}$ from the RAS buffer 3 and the CAS buffer 5, respectively, are supplied to the address buffer 4 to apply timing for accepting the row address signal and the column address signal in the address buffer 4. The signal $\overline{RAS}$ applies operation timing for the memory device. More specifically, when the signal $\overline{RAS}$ falls to L level, the semiconductor memory device starts a memory cycle to effect writing or reading of memory cell data. If the signal $\overline{RAS}$ is at H level, the semiconductor memory device is in a standby state, namely, in the non selected state. The internal address signal from the address buffer 4 is supplied to the memory cell array 6. In the memory cell array 6, the internal address signals (the row address signal and the column address signal) from the address buffer 4 are decoded and data is written into or read out from the memory cell(s) in the memory cell array designated by the row address signal and the column address signal. Since the path for decoding the row address signal and the column address signal and the path for writing and reading the data have little importance to the operation of the present invention, those paths are omitted from the illustration for the purpose of simplification.

In order to apply a bias potential $V_{BB}$ of a predetermined potential level to the semiconductor substrate 150 where the memory devices are provided in an integrated manner, there are a substrate potential detector 280 for detecting the potential of the semiconductor substrate and substrate bias potential generating circuits 10 and 20 which operate selectively and intermittently in response to an output signal from the substrate potential detector 280. Outputs of the substrate bias potential generating circuits 10 and 20 are supplied to the semiconductor substrate 150 through an output terminal 9 The substrate bias potential generating circuit 10 has a relatively small bias capability, while the substrate bias potential generating circuit 20 has a relatively large bias capability.

Figure 8:
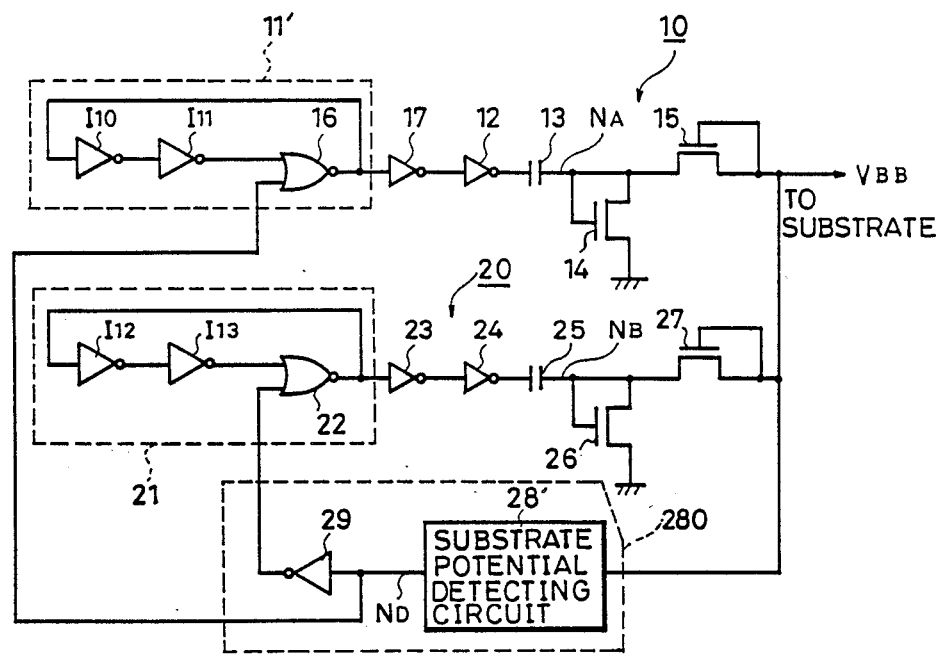
FIG. 8 is a diagram showing an example of a construction of the substrate bias potential generator according to the embodiment.

FIG. 8 is a diagram showing an exemplary construction of the substrate bias potential generating circuit according to the present invention, where the semiconductor substrate is of a p type and the substrate bias potential $V_{BB}$ is a negative potential. Referring to FIG. 8, the substrate bias potential generating circuit 10 having the relatively small bias capability comprises: a ring oscillator 11,; two stages of inverters 17 and 12 for wave-shaping and amplifying the output of the ring oscillator 11'; a charge pump capacitor 13 for receiving the output of the inverter 12; and n channel MOSFETs 14 and 15 for clamping a potential of a node $N_A$ to a predetermined potential according to the charge pump operation of the capacitor 13. The ring oscillator 11, includes two stages of inverters I10 and I11 and an NOR gate 16 having its one input for receiving the output of the inverter I11. The output of the NOR gate 16 is supplied to the inverter 17 and it is also fed back to the input of the inverter I10.

The second substrate bias potential generating circuit 20 has the same construction as the first substrate substrate bias potential generating circuit 1 and it comprises: a ring oscillator 21; two stages of inverters 23 and 24 for wave-shaping and amplifying the output of the ring oscillator 21; a charge pump capacitor 25 for receiving the output of the inverter 24; and n channel MOSFETs 26 and 27 for clamping a potential of a node $N_B$ to a predetermined potential according to the charge pump operation of the capacitor 25. The ring oscillator 21 includes two stages of inverters I12 and I13 and an NOR gate 22 having its one input for receiving the output of the inverter I13. The output of the NOR gate 22 is supplied to the inverter 23 and it is also fed back to the input of the inverter I12.

As described above, the first substrate bias potential generating circuit 10 has the relatively small bias capability, while the second substrate bias potential generating circuit 20 has the relatively large bias capability. In the substrate bias potential generating circuit utilizing this charge pump function, the bias capability is defined by the oscillation frequency of the ring oscillator, the capacitance value of the charge pump capacitor and the size of the transistors. Accordingly, the bias capabilities of the substrate bias potential generating circuits 10 and 20 ar defined by the oscillation frequencies and the capacitance values of the ring oscillators 11' and 21' and the capacitors 13 and 25, as well as the size of the MOSFETs. Although the construction of the ring oscillators 11, and 21 each including two inverters and one NOR gate is shown as an example, this example is given only for the purpose of simplification of the illustration and, needless to say, suitable numbers of stages may be used in reality since the oscillation frequency is defined by the number of stages of inverters and the delay characteristics.

In order to selectively operate either of the substrate bias potential generating circuits 10 and 20 according to the bias potential of the semiconductor substrate, there is a substrate potential detector 280 for detecting the potential of the semiconductor substrate and outputting a signal according to the detection result. The substrate potential detector 280 comprises a substrate potential detecting circuit 28' for detecting the potential of the semiconductor substrate, and an inverter 29 for receiving and inverting the signal indicating the detection result from the substrate detecting circuit 28', and supplying the inverted signal to the other input of the NOR gate 22. The output signal $N_D$ of the substrate potential detecting circuit 28, is supplied to the other input of the NOR gate 16. The construction of the substrate potential detecting circuit 28,, as will be described in detail afterwards, is a construction in which it is connected to the semiconductor substrate through an input having a high input impedance so as not to apply current to the semiconductor substrate the potential o which is to be detected. The substrate potential detecting circuit 28, outputs a signal of H level while the potential of the semiconductor substrate is in a low bias state not attaining the predetermined bias level. On the other hand, when the potential of the semiconductor substrate attains the predetermined level or it is larger than the predetermined level in terms of the absolute value, the output $N_D$ of the substrate potential detecting circuit 28' falls to L level.

Figure 9:
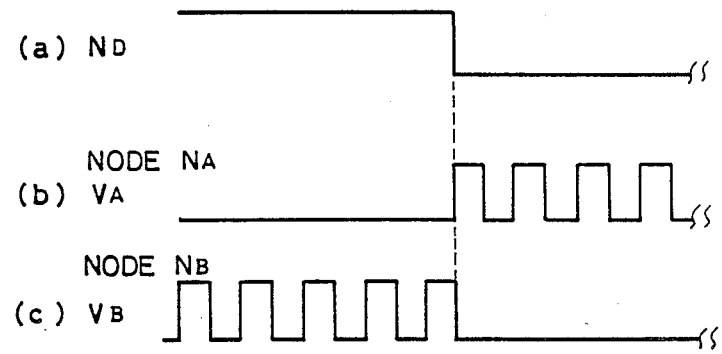
FIG. 9 is a signal waveform diagram showing operation of the substrate bias potential generator shown in FIG. 8.

The NOR gates 16 and 22 generate signals fixed to L level when the signal level applied to the respective other input is H level. On the other hand, the NOR gates 16 and 22 operate as inverters when the signal of L level is applied to the respective other inputs thereof. Accordingly, until the potential of the semiconductor substrate attains the predetermined level, that is, if the signal $N_D$ is at H level, the second ring oscillator 21 effects oscillating operation and the potential of the semiconductor substrate is rapidly lowered to the predetermined level by the second bias potential generating circuit 20 having the larger bias capability. On the other hand, if the potential of the semiconductor substrate attains the predetermined level, the output signal $N_D$ from the substrate potential detecting circuit 28' falls to L level and accordingly the ring oscillator 11' operates and the first substrate bias potential generating circuit 10 having the smaller bias capability operates, whereby the semiconductor substrate is maintained at the predetermined potential level. This operation will be specifically described with reference to FIG. 9 showing the operation waveform diagram of the substrate bias potential generating circuit shown in FIG. 8.

Let us assume a case in which the potential $V_{BB}$ of the semiconductor substrate is at the predetermined level in a shallow bias state. In this case, the output signal $N_D$ of the substrate potential detecting circuit 28, rises to H level. The NOR gate 16 of the ring oscillator 11, receives a signal of H level and outputs a fixed signal of L level independent of the output level of the inverter I11. On the other hand, the NOR gate 22 receives, at its other input, a signal of L level through the inverter 29 and accordingly it operates as an inverter and thus the ring oscillator 21 effects oscillating operation. Consequently, the potential $V_A$ of the node $N_A$ is at L level and the MOSFET 15 is maintained in the off state Thus, charge is not injected into the semiconductor substrate.

On the other hand, in the second substrate bias potential generating circuit 20, the ring oscillator 21 effects oscillating operation. Consequently, the potential $V_B$ of the node $N_B$ oscillates in the same manner as in the above described prior art and the substrate bias potential generating circuit 20 lowers the potential of the semiconductor substrate rapidly to the predetermined level by utilizing the large bias capability.

When the potential of the semiconductor substrate attains the predetermined level as the result of supply of charge from the second substrate bias potential generating circuit 20, the substrate potential detecting circuit 28, outputs a signal of L level this time. In response to this signal $N_D$ of L level, the ring oscillator 11, starts oscillating operation, while the ring oscillator 21 stops the oscillating operation. As a result, the first substrate bias potential generating circuit 10 i activated to inject charge into the semiconductor substrate according to its bias capability, whereby the potential of the semiconductor substrate is maintained at the predetermined bias level.

As described above, only either one of the two substrate bias potential generating circuits having the larger and smaller bias capabilities is selectively operated according to the potential of the semiconductor substrate irrespective of the non-selected or selected state and the operation state of the semiconductor memory device and accordingly consumption of power can be further reduced compared with the conventional construction. In this case, if the substrate potential detecting circuit 28' is connected to the semiconductor substrate through an input having a high input impedance to detect the substrate potential, the substrate potential detecting circuit 28' does not exert any unfavorable influence on the potential of the semiconductor substrate and does not cause any change in the substrate potential. Accordingly, it becomes possible to operate selectively and alternatively only either one of the two substrate bias potential generating circuits correctly in response to the detection of the potential of the semiconductor substrate and the substrate bias potential generating circuit having the larger bias capability is not operated unnecessarily.

Figure 10:
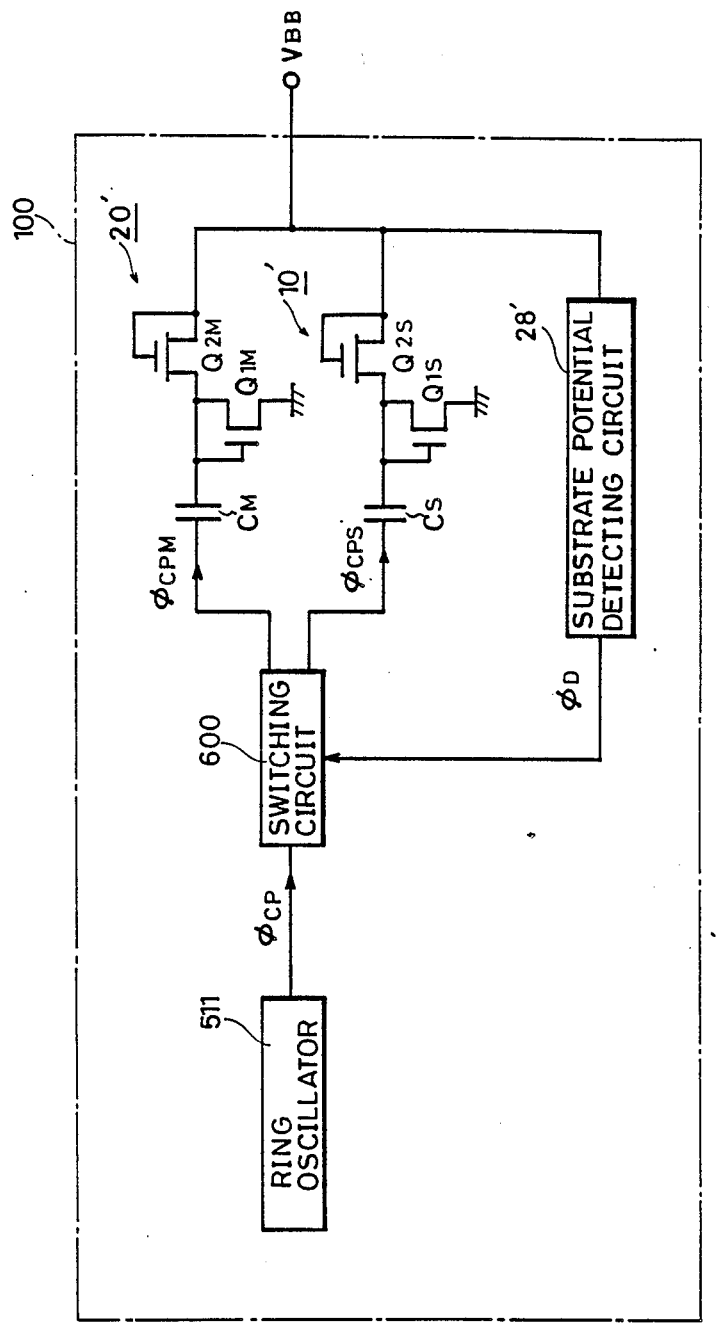
FIG. 10 is a diagram showing an example of a construction of a substrate bias potential generator according to another embodiment of the invention.

FIG. 10 is a diagram showing a schematic construction of a substrate bias potential generating circuit according to another embodiment. In the construction shown in FIG. 10, a ring oscillator 511 is provided in common to substrate bias potential generating circuits (strictly, clock signal rectifying circuits) 10, and 20, and the output of the ring oscillator 511 is applied to either one of the bias potential generating circuits 10, and 20, by means of a switching circuit 600. More specifically, the switching circuit 600 transmits an operation signal $\phi_{CP}$ from the ring oscillator 511 to either one of the substrate bias potential generating circuits 10, and 20, in response to a signal $\phi_D$ indicating the result of detection of the substrate potential from the substrate potential detecting circuit 28'. In this case, the bias capabilities of the substrate bias potential generating circuits 10' and 20' are defined by the oscillation frequency of the ring oscillator 511 and the capacitance values of the respective charge pump capacitors $C_M$ and $C_S$ and accordingly they are set to suitable values, whereby the two substrate bias potential generating circuit having different bias capabilities are provided by using one ring oscillator 511. In this construction, only one ring oscillator for outputting an oscillation signal may be provided and consequently the area occupied by the substrate bias potential generating circuit 100 can be reduced. As a result, the size of the semiconductor memory device can be decreased. The n channel MOSFETs $Q_{1M}$, $Q_{2M}$, $Q_{1S}$ and $Q_{2S}$ each diode-connected in the construction of FIG. 10 perform the same function as the clamping transistors shown in FIG. 8.

Figure 11:
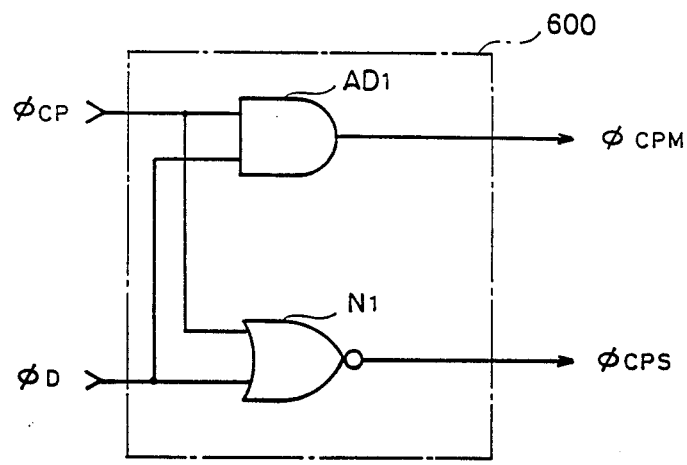
FIG. 11 is a diagram showing an example of a specific construction of the switching circuit shown in FIG. 10.

FIG. 11 is a diagram showing an example of a specific construction of the switching circuit 600 shown in FIG. 10. Referring to FIG. 11, the switching circuit 600 comprises an AND gate AD1 for receiving an oscillation signal $\phi_{CP}$ from the ring oscillator and a detection signal $\phi_D$ from the substrate potential detecting circuit 28', and a NOR gate N1 for receiving the oscillation signal $\phi_{CP}$ and the detection signal $\phi_D$. An output of the AND gate AD1 is supplied as an oscillation signal $\phi_{CPM}$ to the bias potential generating circuit 20' having the larger bias capability. An output of the NOR gate N1 is supplied as an oscillation signal $\phi_{CPS}$ to the first bias potential generating circuit 10' having the smaller bias capability.

Figure 12:
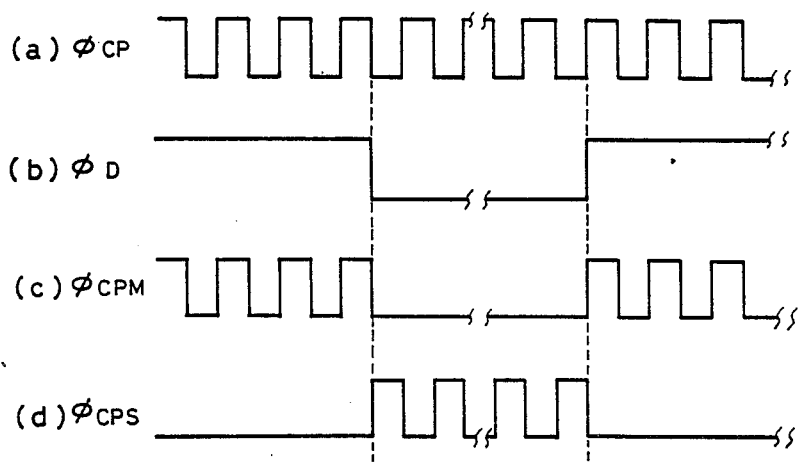
FIG. 12 is a signal waveform diagram showing operation of the switching circuit shown in FIG. 11.

FIG. 12 is a signal waveform diagram showing operation of the switching circuit 600 shown in FIG. 11. In the following, referring to FIGS. 10 to 12, operation of the switching circuit 600 will be described. If the detection signal $\phi_D$ of the substrate potential detecting circuit 28' is at H level, that is, if the potential of the semiconductor substrate does not attain the predetermined level, the AND gate AD1 permits the oscillation signal $\phi_{CP}$ to pass therethrough. On the other hand, the output of the NOR gate N1 is maintained at L level independent of the level of the oscillation signal $\phi_{CP}$. Accordingly, if the detection signal is at H level, the oscillation signal $\phi_{CPM}$ is supplied to the capacitor $C_M$ of the second substrate bias potential generating circuit 20, having the larger bias capability, whereby the potential of the semiconductor substrate is rapidly lowered to the predetermined level.

On the other hand, when the potential of the semiconductor substrate attains the predetermined level and the detection signal $\phi_D$ from the substrate potential detecting circuit 28' falls to L level, the output of the AND gate AD1 falls to L level, while the NOR gate N1 operates as an inverter. Accordingly, the oscillation signal $\phi_{CPM}$ is fixed to L level and the oscillation signal $\phi_{CPS}$ is an oscillation signal obtained by inversion of the oscillation signal $\phi_{CP}$ from the ring oscillator 511. As a result, the first substrate bias potential generating circuit 10' having the smaller bias capability operates and the potential of the semiconductor substrate is maintained at the predetermined level by the charge pump function of the capacitance Cs.

Figure 1:
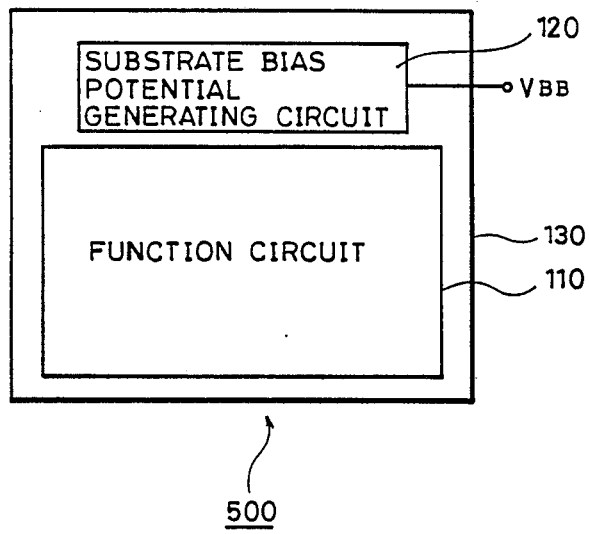
FIG. 1 is a diagram schematically showing a main part of the whole structure of a conventional semiconductor integrated circuit device.
Figure 2:
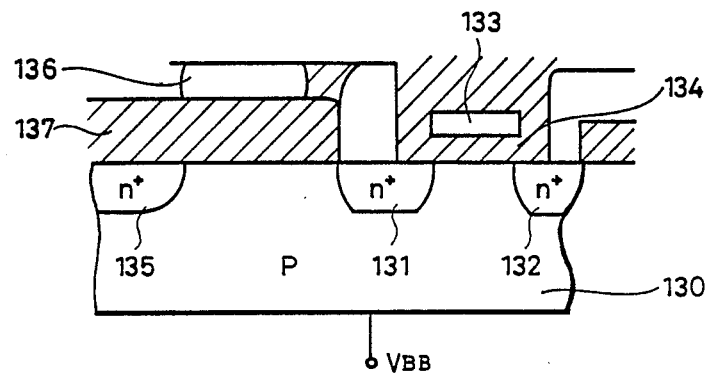
FIG. 2 is a view for explaining an effect of a substrate bias potential.
Figure 3:
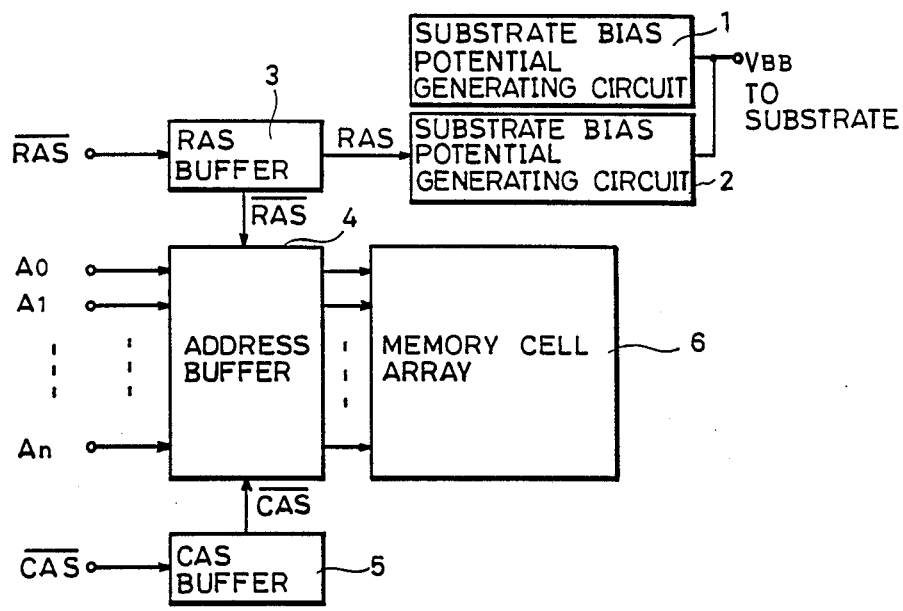
FIG. 3 is a diagram showing a general construction of a semiconductor memory device comprising a conventional substrate bias potential generating circuit.
Figure 4:
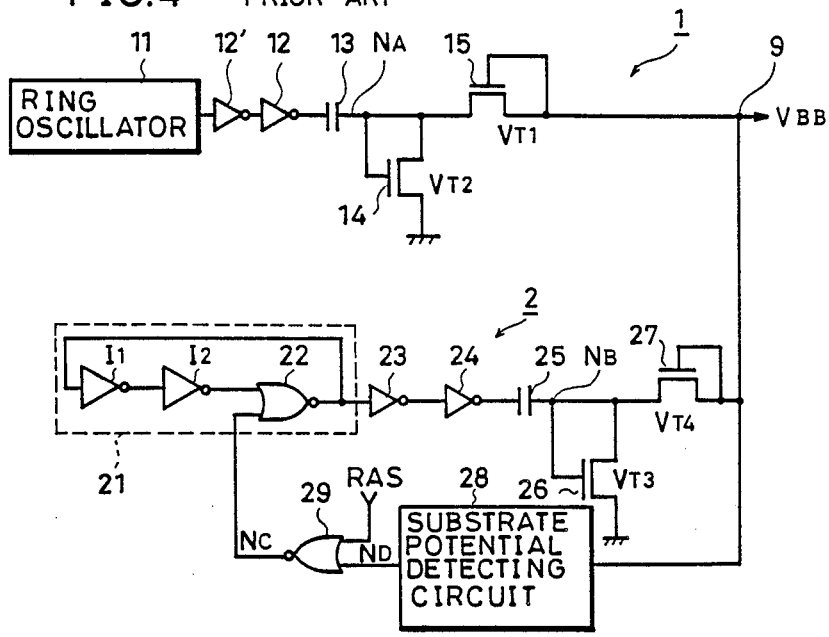
FIG. 4 is a schematic diagram showing a construction of a conventional substrate bias potential generating circuit.
Figure 5:
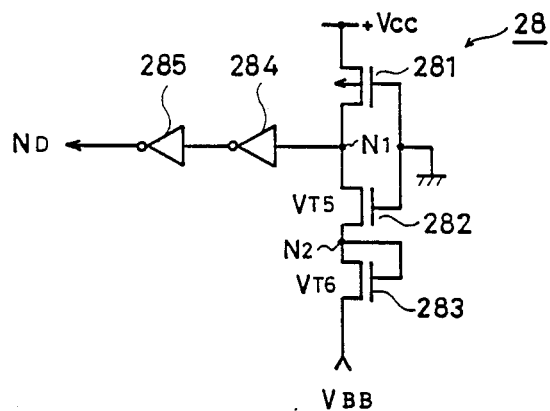
FIG. 5 is a diagram showing an example of a construction of the substrate potential detecting circuit shown in FIG. 4.
Figure 6:
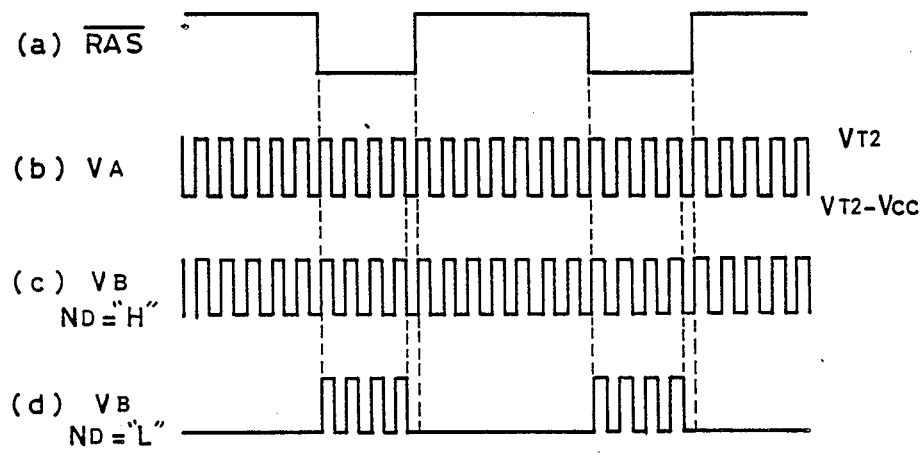
FIG. 6 is a signal waveform diagram showing operation of the substrate bias potential generating circuit shown in FIG. 4.
Figure 13:
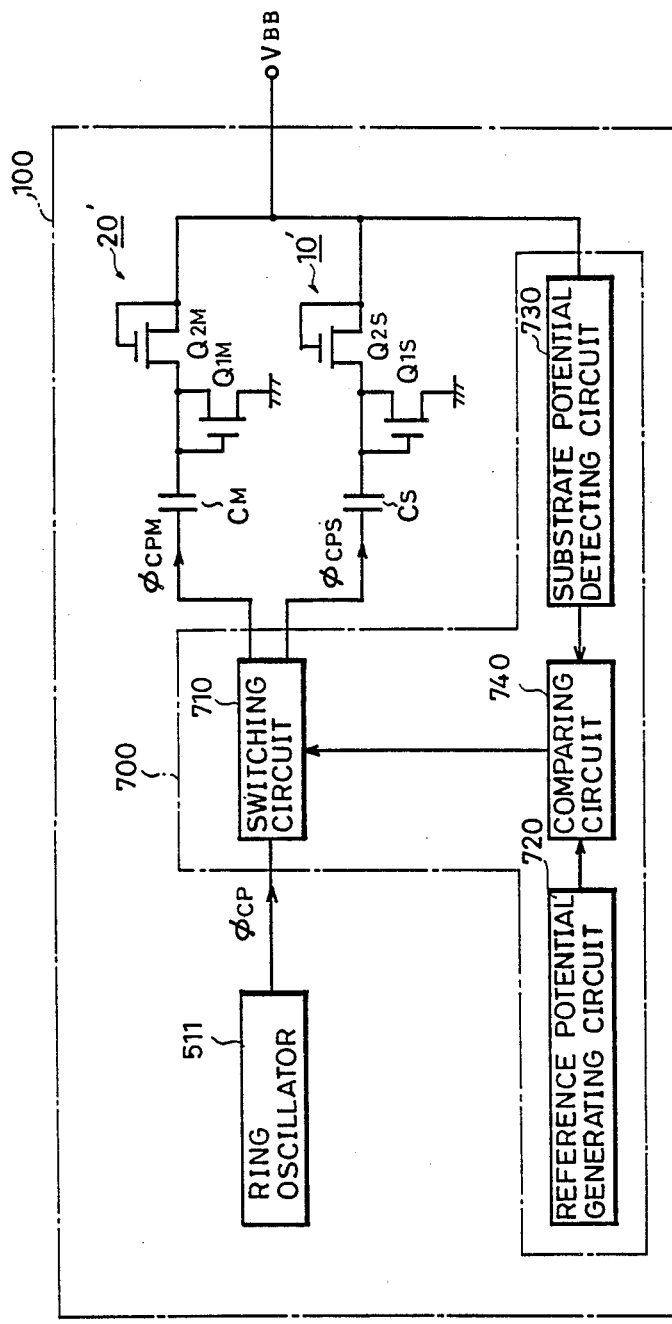
FIG. 13 is a diagram showing a construction of a substrate bias potential generator according to a further embodiment of the invention.

FIG. 13 is a diagram showing a construction of a substrate bias potential generating circuit according to another embodiment of the invention. The construction of FIG. 13 includes a reference potential generating circuit 720 for generating a reference potential of a predetermined level, a comparing circuit 740 for comparison with the output of the substrate potential detecting circuit 730, and a switching circuit 710 for transmitting the oscillation signal $\phi_{CP}$ from the ring oscillator 511 to either of the substrate bias potential generating circuits 10' and 20' in response to the output of the comparing circuit 740. The reasons for providing the reference potential generating circuit 720 in the control circuit 700 for selecting the bias potential generating circuit are as follows. It is necessary to lower the potential of the semiconductor substrate to the predetermined level rapidly at the time of turn-on of the power supply of the semiconductor memory device. However, for example in the case of simply adopting a construction utilizing a threshold voltage of MOSFET similar to the detection circuit as shown in FIG. 5 as the substrate potential detecting circuit 730, it may be considered that the level of the output potential (the detection output signal) attains H level with a considerable delay from the rise of the power supply potential. In such as case, only the substrate bias potential generating circuit having the smaller bias capability is operated and accordingly it may be considered to be difficult to lower the potential of the substrate rapidly to the predetermined potential. Accordingly, as shown in FIG. 13, the internal reference potential generating circuit 720 (as will be described in detail later) is provided to enable the substrate potential to rapidly attain the predetermined level in such cases as turn-on of the power supply of the semiconductor memory device and by comparing the output of the reference potential generating circuit 720 and the output of the substrate potential detecting circuit 730, the second substrate bias potential generating circuit having the larger bias capability is operated so that the potential of the semiconductor substrate can attain the predetermined potential level rapidly.

Figure 14:
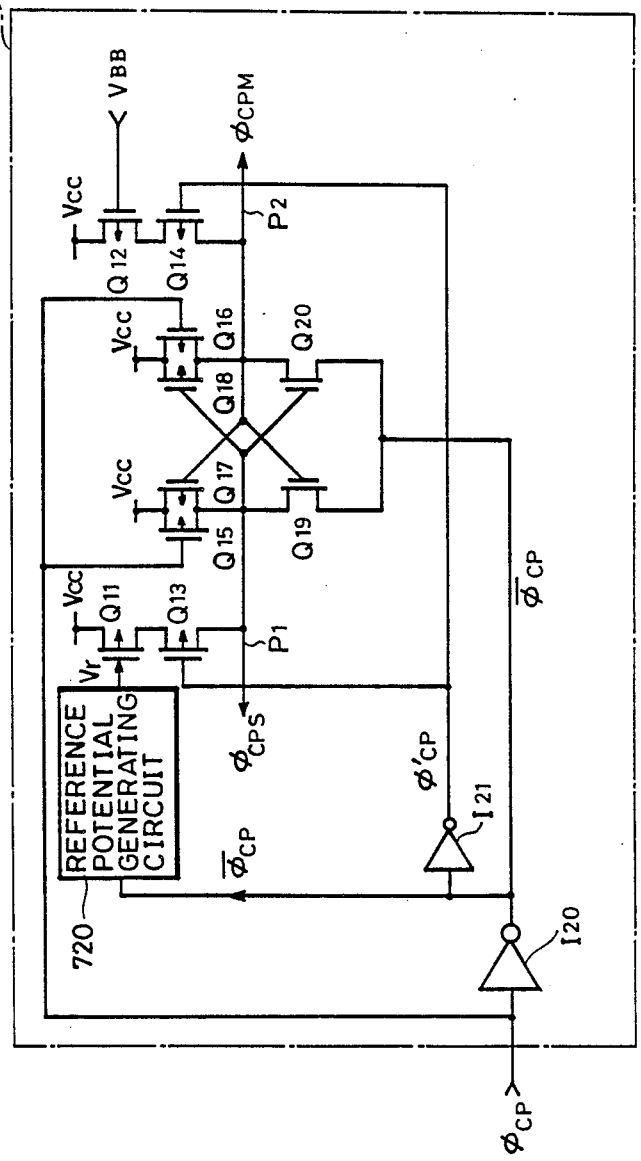
FIG. 14 is a diagram showing a construction example of the substrate bias potential generator selection control circuit shown in FIG. 13.

FIG. 14 is a diagram showing an example of a specific construction of the selection control circuit 700 shown in FIG. 13. Referring to FIG. 14, the selection control circuit 700 comprises: a reference potential generating circuit 720 for generating a reference potential which attains the predetermined level more rapidly compared with the substrate potential after turn-on of the power supply; a p channel MOSFET Q11 for detecting an output potential Vr of the reference potential generating circuit; a p channel MOSFET Q12 for detecting the substrate potential $V_{BB}$; and MOSFETs Q17, Q18, Q19 and Q20 for generating signals for inactivating one of the substrate bias potential generating circuits and activating the other substrate bias potential generating circuit in response to the detection outputs of the MOSFETs Q11 and Q12. The transistors Q17 to Q20 constitute a CMOS flip-flop differential amplifier which generates signals, according to the outputs of the detection by MOSFETs Q11 and Q12, at output nodes P1 and P2. The output nodes P1 and P2 output the oscillation signals $\phi_{CPS}$ and $\phi_{CPM}$ to be applied to the first substrate bias potential generating circuit having the smaller bias capability and the second substrate bias potential generating circuit 20 having the larger bias capability, respectively.

There are provided p channel MOSFETs Q13 and Q14 between the detection MOSFETs Q11 and Q12 and the output nodes P1 and P2, respectively. The MOSFETs Q13 and Q14 function as cut-off transistor for preventing current from flowing from the power supply potential Vcc to the output nodes P1 and P2 when the detection transistors Q11 and Q12 are turned on. There are provided p channel MOSFETs Q15 and Q16 in parallel with the MOSFETs Q17 and Q18, respectively, to precharge the output nodes P1 and P2 to predetermined potential levels. The oscillation signal $\phi_{CP}$ is applied from the ring oscillator 511 to the gates of the MOSFETs Q15 and Q16. Accordingly, when the oscillation signal $\phi_{CP}$ falls to L level, the MOSFETs Q15 and Q16 are turned on to precharge the nodes P1 and P2 to the level of the power supply potential Vcc. The oscillation signal is applied to the respective one conduction terminals (sources) of the n channel MOSFETs Q19 and Q20 through the inverter I20 so that the flip-flop differential amplifier (i.e., the circuit formed by the MOSFETs Q17 to Q20) is activated.

An internal control signal $\phi_{CP}'$ is applied to the gates of the MOSFETs Q13 and Q14 which function as cutoff transistors. The internal control signal $\phi_{CP}'$ is formed by causing the oscillation signal $\phi_{CP}$ from the ring oscillator 511 to pass through the inverters I20 and I21.

Figure 15:
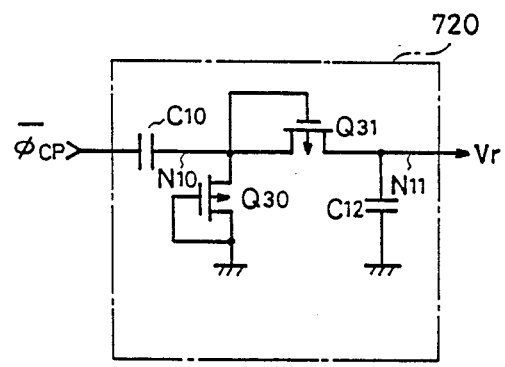
FIG. 15 is a diagram showing an example of a construction of the reference potential generating circuit shown in FIG. 14.
Figure 16:
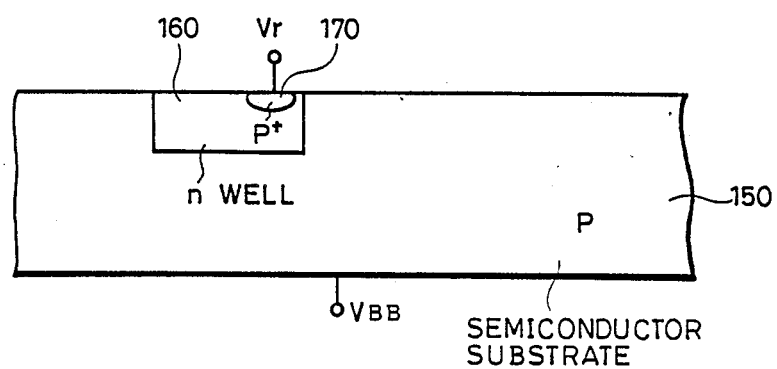
FIG. 16 is a schematic view showing a region where a reference potential from the reference potential generating circuit is shown in FIG. 15 is applied.

The reference potential generating circuit 720 for forming the reference potential Vr has a construction as shown in FIG. 15. Referring to FIG. 15, the reference potential generating circuit 720 includes a charge pump capacitor C10, p channel MOSFETs Q30 and Q31 which cooperate with the charge pump operation of the capacitor C10 and clamps the potential of the node N10 to the predetermined potential, and a parasitic capacitance C12. The p channel MOSFET Q30 is provided between the node N10 and the ground potential and it clamps the potential of the node N10 at the threshold voltage level thereof. The p channel MOSFET Q31 is provided between the node N10 and an output node N11 and it clamps the potential of the node N10 at a value determined by the threshold voltage thereof and the reference potential Vr. The P channel MOSFETs Q30 and Q31 are both diode-connected. The reference potential generating circuit 720 is formed in an n type well region 160 formed on the surface of the p type semiconductors substrate 150, as shown in FIG. 16, since its components are a capacitor and a p channel MOSFET. The parasitic capacitance C12 includes a junction capacitance between its circuit element and the n type well 160, a junction capacitance formed between the p type region 150 and the n type well region 160, and the like.

The output Vr from the reference potential generating circuit 720 is applied to the p+type impurity region 170 formed in the n type well 160 to bias the p+impurity region 170 to a predetermined level according to the potential of the power supply. The reference potential Vr has a negative polarity in the same manner as the reference bias potential applied to the semiconductor substrate 150. The signal $\phi_{CP}$ for operating the reference potential generating circuit 720 is applied through the inverter I20.

Figure 17:
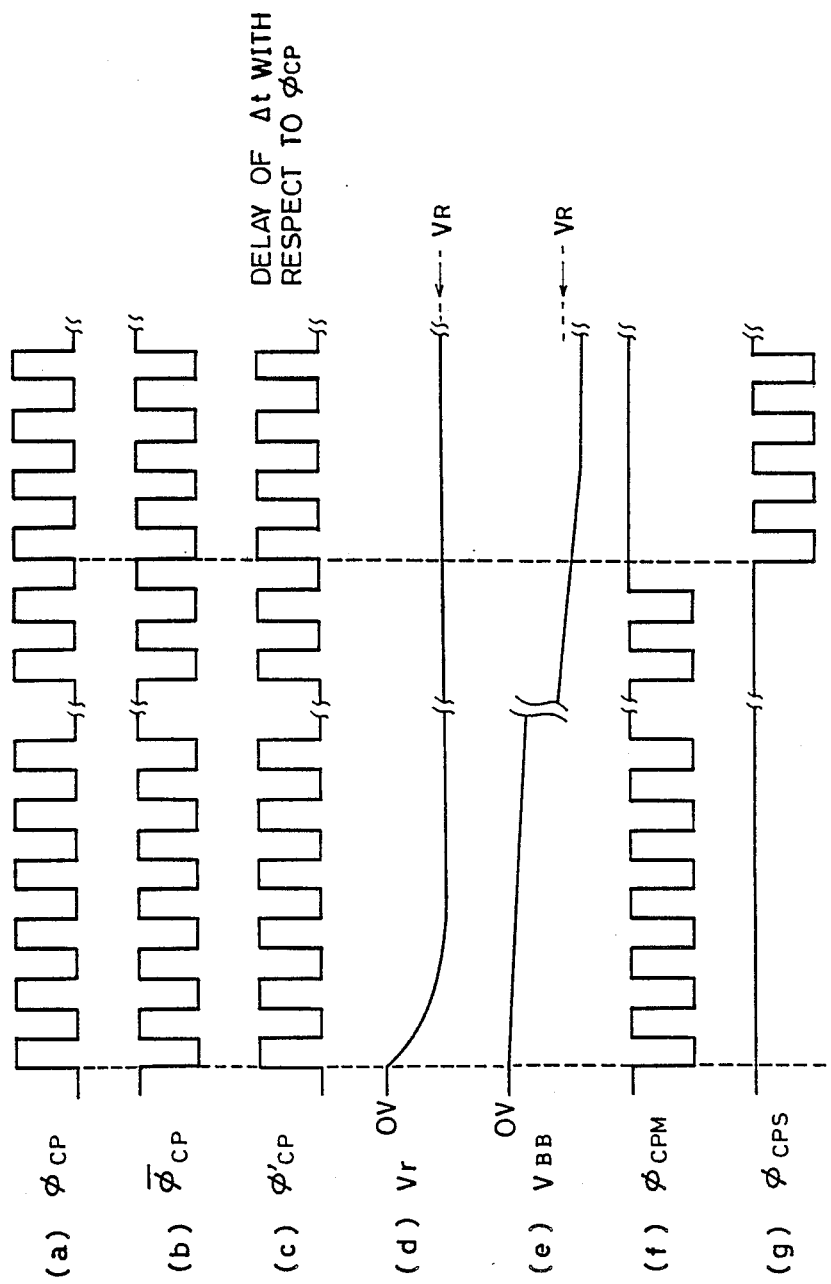
FIG. 17 is a signal waveform diagram showing operation of the selection control circuit shown in FIG. 14.

FIG. 17 is a signal waveform diagram showing operation of the substrate bias potential generating circuit shown in FIG. 14. Referring to FIGS. 14 to 17, operation of the substrate bias potential generating circuit according to the embodiment of the invention will be described in the following.

In an initial state such as in turn-on of the power supply for the semiconductor memory device, the reference potential Vr and the substrate bias potential $V_{BB}$ are both at OV as the ground potential level. However, when the ring oscillator 511 shown in FIG. 7 starts oscillating operation in response to the turn-on of the power supply, the reference potential Vr outputted from the reference potential generating circuit 720 rapidly attains the predetermined level $-V_R$. On the other hand, the substrate bias potential $V_{BB}$ applied to the semiconductor substrate 150 attains slowly a predetermined bias level compared with the fall of the reference potential Vr. A time difference in lowering of the reference potential Vr and the substrate bias potential $V_{BB}$ is caused by the below described reasons. The reference potential generating circuit 720 is formed in the n type well region 160. In order to generate the reference potential Vr, the potential of the p+type impurity region 170 of a small volume formed in the n type well region 160 is lowered. Thus, the reference potential can rapidly attain the predetermined bias potential $-V_R$. On the other hand, in order to lower the potential of the semiconductor substrate 150 to the predetermined potential, it is necessary to lower the potential of the whole semiconductor substrate 150. In view of a ratio of capacities (about several thousands times as much) of the p+type impurity region 170 and the semiconductor substrate 150, a relatively long time (about several hundreds of micro seconds) is required to lower the potential of the semiconductor substrate 150. Accordingly, in the initial state in which the reference potential Vr is larger than the substrate bias potential $V_{BB}$ in terms of the absolute value, the impedance of the MOSFET Q11 becomes smaller than that of the MOSFET Q12. When the oscillation signal $\phi_{CP}$ falls to L level, the precharge MOSFETs Q15 and Q16 are turned on and the output nodes P1 and P2 are precharged to H level as the level of the power supply potential Vcc. At this time, the output signal $\phi_{CP}$ from the inverter I20 is at H level and accordingly the flip-flop differential amplifier formed by the MOSFETs Q17 to Q20 does not operate.

Next, when the oscillation signal $\phi_{CP}$ rises to H level, the precharge transistors Q15 and Q16 are turned off and the precharge operation of the nodes P1 and P2 is stopped. At this time, since the oscillation signal $\phi_{CP}$ is transmitted to the cutoff MOSFETs Q13 and Q14 through the inverters I20 and I21, respectively, the signal is transmitted with a delay from the oscillation signal $\phi_{CP}$ corresponding to a delay time in the two stages of inverters I20 and I21. Accordingly, the MOSFETs Q13 and Q14 are turned off with a delay corresponding to this delay time from the turn-off of the precharge transistor MOSFETs Q15 and Q16. When the output signal $\phi_{CP}$ of the inverter I20 falls to L level in the above described state, the MOSFETs Q13 and Q14 for cut-off are still in the on state and accordingly a potential difference is produced between the nodes P1 and P2. Consequently, the flip-flop differential amplifier formed by the MOSFETs Q17 to Q20 operates to change the potential level of the output node P1 to H level and the output level of the output node P2 to L level. Then, when the oscillation signal $\phi_{CP}$ falls to L level, the output nodes P1 and P2 are precharged to the predetermined power supply potential level in the same manner as described previously. This operation is repeated and if the reference potential Vr is larger than the substrate bias potential $V_{BB}$ in terms of the absolute value, the output signal $\phi_{CPS}$ from the output node P1 rises to H level, in response to the oscillation signal $\phi_{CP}$, and the output signal $\phi_{CPM}$ from the output node P2 becomes an oscillation signal corresponding to the oscillation signal $\phi_{CP}$. Thus, the first substrate bias potential generating circuit 10' shown in FIG. 13 does not operate and the second substrate bias potential generating circuit 20' having the larger bias capability operates, thereby to lower the potential of the semiconductor substrate 150 rapidly to the predetermined potential level.

In the waveform diagram of FIG. 17, the signals $\phi_{CP}$ and $\phi_{CP}'$ are represented as having waveforms of the same phase for the purpose of simplification of the illustration; however, in practice, the signal $\phi_{CP}'$ changes with a delay from the signal $\phi_{CP}$, corresponding to a delay time by the inverters of I20 and I21.

When the potential of the semiconductor substrate 150 becomes larger than the reference potential Vr in terms of the absolute value, the signal $\phi_{CPS}$ becomes an oscillation signal corresponding to the oscillation signal $\phi_{CP}$ and the signal $\phi_{CPM}$ is fixed to a H level, oppositely to the above described operation. As a result, when the bias potential of the semiconductor substrate becomes larger than the predetermined reference potential $-V_R$ (=Vr) in terms of the absolute value only the first substrate bias potential generating circuit 10' having the smaller bias capability operates. In the above described construction, not only after a sufficient rise of the power supply potential but also immediately after turn-on of the power supply potential, either substrate bias potential generating circuit can be operated dependent on its bias capability according to the potential of the semiconductor substrate and thus consumption of power can be reduced.

In addition, in the above described construction, the gate electrode of the MOSFET Q12 is connected to the semiconductor substrate in order to detect the potential $V_{BB}$ of the semiconductor substrate and accordingly the substrate potential detecting circuit detects the substrate potential through the input having the high input impedance. Consequently, the substrate potential detecting circuit itself does not exert any adverse effect on the potential of the semiconductor substrate, such as leakage current into the substrate, and only either substrate bias potential generating circuit can be operated correctly in response to the potential of the semiconductor substrate.

Figure 18:
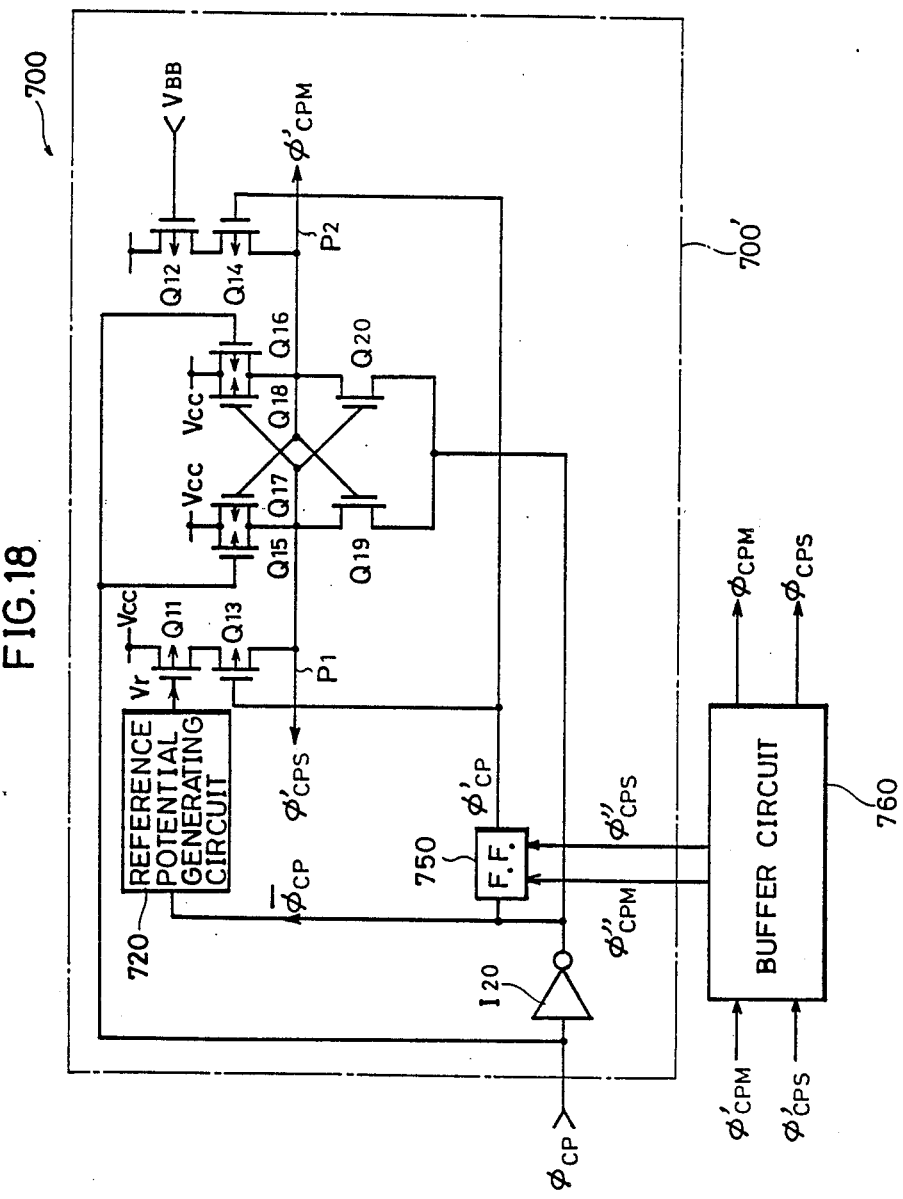
FIG. 18 is a diagram showing a construction of a selection control circuit according to a further embodiment of the invention.

FIG. 18 is a diagram showing another construction example of the selection control circuit shown in FIG. 13. In FIG. 18, the portions corresponding to those in FIG. 14 are denoted by the same reference characters.

In the construction of FIG. 18, the control signal $\phi_{CP}'$ for controlling operation of the MOSFETs Q13 and Q14 for cut-off is generated by a flip-flop 750 in place of the inverter I21 shown in FIG. 14. The flip-flop 750 receives a signal $\overline{\phi_{CP}}$ from the inverter I20 and signals $\phi_{CPS}''$ and $\phi_{CPM}''$ from the buffer circuit 760. The buffer circuit 760 outputs not only the operation control signals $\phi_{CPM}''$ and $\phi_{CPS}''$ for the flip-flop 750 but also the operation control signals $\phi_{CPM}$ and $\phi_{CPS}$ for the substrate bias potential generating circuit 10, and 20, in response to the signals $\phi_{CPM}'$ and $\phi_{CPS}'$ from the comparison detecting circuit 700'.

The comparison detecting circuit 700' has the same construction as that of the selection control circuit of FIG. 14 and it compares the reference potential Vr from the reference potential generating circuit 720 and the substrate potential $V_{BB}$ and outputs signals $\phi_{CPM}'$ and $\phi_{CPS}'$ according to the result of the comparison.

Figure 19:
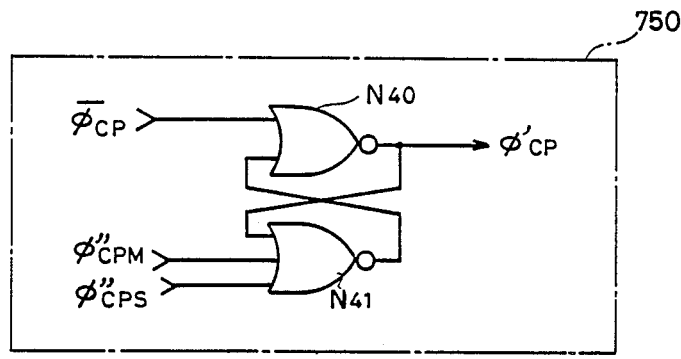
FIG. 19 is a diagram showing an example of a construction of the flip-flop shown in FIG. 18.

A specific example of the flip-flop 750 is shown in FIG. 19. Referring to FIG. 19, the flip-flop 750 includes two NOR gates N40 and N41. The NOR gate N40 receives the signal $\phi_{CP}$ from the inverter I20 and the output of the NOR gate N41. The NOR gate N41 receives the two control signals $\phi_{CPM}''$ and $\phi_{CPS}''$ from the buffer circuit 760 and the output of the NOR gate N40. The NOR gate N40 outputs the signal $\phi_{CP}'$ for controlling the operation of the MOSFETs Q13 and Q14 for current cutoff. In the flip-flop 750, the output signal $\phi_{CP}'$ is reset to L level if the signal $\phi_{CP}$ is at H level.

Figure 20:
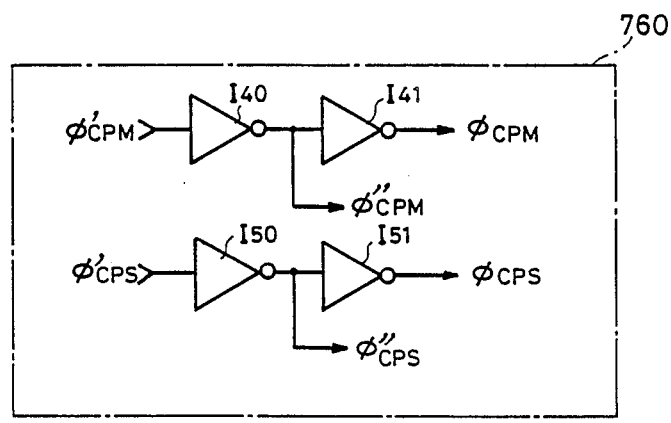
FIG. 20 is a diagram showing an example of a construction of the buffer circuit shown in FIG. 18.

FIG. 20 is a diagram showing a specific example of the buffer circuit 760 shown in FIG. 18. Referring to FIG. 20, the buffer circuit 760 comprises a path for outputting the signal $\phi_{CPM}$ for controlling the operation of the substrate bias potential generating circuit 20' having the larger bias capability, and a path for outputting the signal $\phi_{CPS}$ for controlling the operation of the first substrate bias potential generating circuit 10' having the smaller bias capability. The path for outputting the signal $\phi_{CPM}$ includes two stages of inverters I40 and I41 cascade-connected for receiving the signal $\phi_{CPM}'$ from the output node P2 of the comparison detecting circuit 700'. The inverter I40 outputs the signal $\phi_{CPM}''$ for controlling the operation of the flip-flop 750 and the inverter I41 outputs the signal $\phi_{CPM}$ for controlling the operation of the substrate bias potential generating circuit 20'.

The path for outputting the signal $\phi_{CPS}$ includes two stages of inverters I50 and I51 cascade-connected for receiving the signal $\phi_{CPS}'$ from the output node P1 of the comparison detecting circuit 700'. The inverter I50 outputs the signal $\phi_{CPS}''$ for controlling the operation of the flip-flop 750 and the inverter I51 outputs the signal $\phi_{CPS}$ for controlling the operation of the substrate bias potential generating circuit 10'. Referring now to FIGS. 18 to 20, operation of a bias potential switching circuit according to another embodiment of the invention will be described.

First, let us assume a case in which the output signal $\phi_{CP}$ from the inverter I20 is at H level while the ring oscillator 511 effects oscillating operation. In this case, the flip-flop 750 is in the reset state. More specifically, since the signal of H level is inputted to the one input of the NOR gate N40, a signal of L level is outputted from the NOR gate N40 independent of $\phi_{CPM}''$ and $\phi_{CPS}''$. In response thereto, the MOSFETs Q13 and Q14 for cutoff are both in the on state. The output nodes P1 and P2 are precharged to H level.

Then, when the output signal $\phi_{CP}$ from the inverter I20 changes to L level, the flip-flop differential amplifier of the CMOS structure formed by the MOSFETs Q17 to Q20 is activated to start comparison between the reference potential Vr from the reference potential generating circuit 720 and the substrate bias potential $V_{BB}$. Since the output nodes P1 and P2 have been precharged at H level through the MOSFETs Q15 and 16 respectively, before activation of the differential amplifier, the signals $\phi_{CPM}'$ and $\phi_{CPS}'$ from the output nodes P1 and P2 are both raised to H level and consequently the output signals $\phi_{CPM}''$ and $\phi_{CPS}''$ from the buffer circuit 760 are both lowered to L level. Accordingly, in the initial activation state of the flip-flop differential amplifier of the CMOS structure (namely in a state in which a potential difference between the reference potential Vr and the substrate bias potential $V_{BB}$ is not increased), the flip-flop 750 is maintained in the reset state and the output signal $\phi_{CP}'$ is maintained at L level. Consequently, even if the flip-flop differential amplifier of the CMOS structure is activated, the MOSFETs Q13 and Q14 for cutoff are both in the on state.

Next, when the potential levels of the node P1 and P2 are fixed to H level and L level, respectively, according to the result of the comparison between the reference potential Vr and the substrate bias potential $V_{BB}$ as a result of the operation of the differential amplifier, either one of the output signals $\phi_{CPM}''$ and $\phi_{CPS}''$ from the buffer circuit 760 rises to H level. As a result, the flip-flop 750 is set and the output signal $\phi_{CP}'$ rises to H level. More specifically, when one input of the NOR gate N41 attains H level, the output of the NOR gate N41 falls to L level accordingly. As a result, both inputs of the NOR gate N40 fall to L level and thus the output signal $\phi_{CP}'$ rises to H level. In response to the signal $\phi_{CP}'$ of H level, the MOSFETs Q13 and Q14 for cutoff are both turned off, thereby to cut off the path through which the penetration current flows from the power supply potential Vcc to the output nodes P1 and P2 through the MOSFETs Q11 and Q12 for detection. On the other hand, the potential levels of the output nodes P1 and P2 are outputted as the control signals $\phi_{CPM}$ and $\phi_{CPS}$ from the buffer circuit 760 and those signals are transmitted to the first and second substrate bias potential generating circuits 10' and 20'.

When the oscillation signal $\phi_{CP}$ falls again to L level and the output signal $\phi_{CP}$ from the inverter I20 rises to H level, the flip-flop 750 is reset and the output nodes P1 and P2 are precharged to H level as the power supply potential level. By repeating this operation, only either one of the substrate bias potential generating circuits is activated dependent on the difference between the substrate potential and the reference potential.

In the case of the construction shown in FIG. 14, it is considered that the MOSFETs Q13 and Q14 might be turned off before the difference between the reference potential Vr and the substrate bias potential $V_{BB}$ is detected, dependent on the detection sensitivity of the CMOS flip-flop type differential amplifier formed by the MOSFETs Q17 to Q20, in cases where the reference potential Vr from the reference potential generating circuit 720 becomes very close to the value of the substrate bias potential $V_{BB}$. This is because the MOSFETs Q13 and Q14 for cutoff are turned off with predetermined timing independent of the detection operation of the differential amplifier, namely, the output levels of the output nodes P1 and P2 since the operation of the cutoff MOSFETs Q13 and Q14 is simply controlled by the delay time by the inverters I21 and I20. Thus, if the cutoff MOSFETs Q13 and Q14 are turned off before the difference between the substrate potential $V_{BB}$ and the reference potential Vr is detected, the potential levels of the output nodes P1 and P2 are both at intermediate levels and it might happens that penetration current flows continuously from the power supply potential Vcc to the ground potential level through the CMOS flip-flop differential amplifier during the period of H level of the oscillation signal $\phi_{CP}$. However, if the flip-flop 750 is used in place of the inverter for delay as shown in FIG. 18, the CMOS flip-flop differential amplifier is activated and the cutoff MOSFETs Q13 and Q14 can be turned off after the potential levels of the output nodes P1 and P2 are fixed to the level obtained by differential amplification of the difference between the reference potential Vr and the substrate bias potential $V_{BB}$. Accordingly, the time required for the potential levels of the output nodes P1 and P2 to attain the intermediate level can be minimized and, a period in which penetration current flows in the CMOS flip-flop differential amplifier can be made very small, making it possible to further reduce consumption of current and to detect reliably the difference between the reference potential Vr and the substrate bias potential $V_{BB}$.

Figure 21:
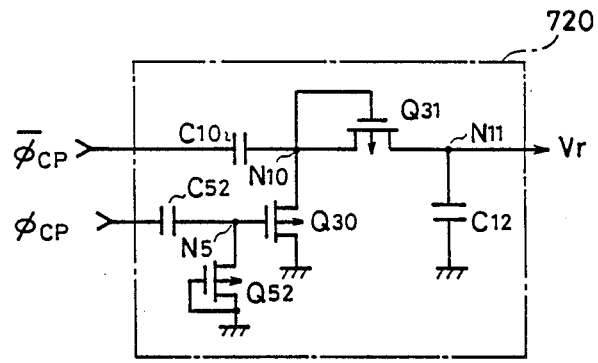
FIG. 21 is a diagram showing another construction example of the reference potential generating circuit shown in FIGS. 14 and 18.

FIG. 21 is a diagram showing another construction example of a reference potential generating circuit. Referring to FIG. 21, the reference potential generating circuit 720 comprises: a charge pump capacitor C10 for receiving an oscillation signal $\overline{\phi_{CP}}$; a p channel MOSFET Q31 for clamping the potential of the node N10 to a value according to the difference between the reference potential Vr and the threshold voltage V of the MOSFET Q31; a p channel MOSFET Q30 for clamping the potential of the node N10 to the ground potential level; a capacitor C52 and a p channel MOSFET Q52 for controlling the clamping operation of the MOSFET Q30; and a parasitic capacitance C12 formed between one conduction region (impurity region) of the MOSFET Q31 and the semiconductor substrate (the n type well region in this example). The gate of the MOSFET Q30 is connected to the charge pump capacitor C52 which receives the oscillation signal $\phi_{CP}$. A diode-connected p channel MOSFET Q52 is provided at a node of connection of the capacitor C52 and the gate of the MOSFET Q30, namely, between the node N5 and the ground potential.

In the construction of the reference potential generating circuit shown in FIG. 15, the reference potential Vr generated therein is a level of $-(Vcc-Vt(31)-Vt(30))$ where Vt(30) and Vt(31) are absolute values of the threshold voltages of the MOSFETs Q30 and Q31, respectively. Accordingly, in the construction shown in FIG. 15, the potential to be attained by the reference potential Vr cannot be made smaller than the above indicated value, namely, cannot be made larger than that in terms of the absolute value. However, in the construction shown in FIG. 21, the value of the reference potential Vr can be set to a lower potential. In the following, operation of the reference potential generating circuit shown in FIG. 21 will be briefly described. If the oscillation signal $\phi_{CP}$ is at H level, the potential of the node N5 tends to rise to H level due to capacitance coupling of the capacitor C52; however, by the function of the MOSFET Q52, the potential of the node N5 is clamped to the ground potential level |Vt (52)|. Then, when the operation signal $\phi_{CP}$ falls to L level and the complementary oscillation signal $\overline{\phi_{CP}}$ rise to H level, the potential of the node N10 tends to rise H level, while the potential of the node N5 is lowered to a negative potential. At this time, if the capacitance of the capacitor C52 and the threshold voltage of the MOSFET Q5 are set to enable the potential of the node N5 to be lower than the threshold voltage Vt(30) of the MOSFET Q30, the MOSFET Q30 is completely conducted and the potential level of the node N10 is clamped to the ground potential level. Accordingly, when the complementary oscillation signal $\overline{\phi_{CP}}$ falls to L level next, the potential of the node N10 becomes −(Vr-Vt(31)) level. In the case of lowering the potential of the node N10, the complementary signal $\overline{\phi_{CP}}$ falls to L level. However, in that case, the oscillation signal $\phi_{CP}$ rises to H level at the same time and accordingly independent of the clamping operation of the MOSFET Q52, the potential level becomes higher than the threshold voltage level of the MOSFET Q30, whereby the MOSFET Q30 is turned off. Accordingly, the attainable potential level of the node N10 is −(Vr−Vt(31)). If the oscillation signal $\phi_{CP}$ is continuously applied, the attainable potential of the reference potential Vr can be lower to −(Vcc−Vt(31)). Assuming that the threshold voltages of the MOSFETs Q30 and Q31 are −1.5 V and that the operation power supply potential Vcc is 5 V, the attainable potential of the reference potential Vr is −2 V in the case of the construction of the reference potential generating circuit shown in FIG. 15, while the attainable potential of the reference potential Vr can be set to −3.5 V in the case of the reference potential generating circuit shown in FIG. 21.

Figure 22:
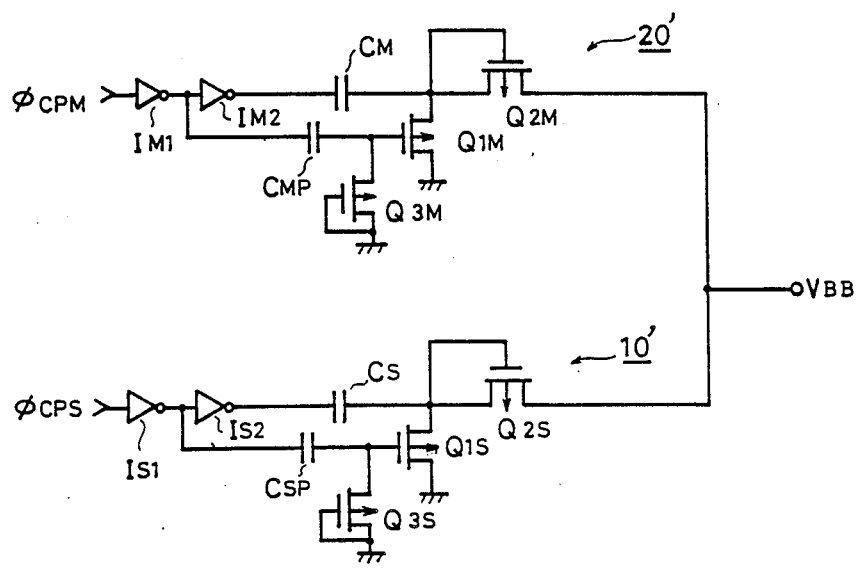
FIG. 22 is a diagram showing a further construction example of the substrate bias potential generator.

If the reference potential generating circuit shown in FIG. 21 is applied to the substrate bias potential generating circuit, the substrate bias potential generating circuit of the construction as shown in FIG. 22 can be obtained. Referring to FIG. 22, the substrate bias potential generating circuit 20' having the larger bias capability includes two stages of inverters $I_{M1}$ and $I_{M2}$ which are cascade-connected for receiving the oscillation signal $\phi_{CPM}$, a charge pump capacitor CM connected to an output of the inverter $I_{M2}$, a charge pump capacitor $C_{MP}$ connected to an output of the inverter $I_{M1}$, and p channel MOSFETS $Q_{1M}$, $Q_{2M}$ and $Q_{3M}$ for generation of the substrate potential. The MOSFETs $Q_{1M}$, $Q_{2M}$ and $Q_{3M}$ have the same function and the same connection construction as the MOSFETs Q30, Q31 and Q52.

The substrate bias potential generating circuit 10, having the smaller bias capability includes two stages of inverters $I_{S1}$ and $I_{S2}$ cascade-connected for receiving the oscillation signal $\phi_{CPS}$, a capacitor $C_{SP}$ for carrying out charge pump operation according to an output of the inverter $I_{S1}$, a capacitor $C_S$ for carrying out charge pump operation according to an output of the inverter $I_{S2}$, and p channel MOSFETs $Q_{1S}$, $Q_{2S}$ and $Q_{3S}$ for generating a predetermined bias potential level according to the charge pump operation of the capacitors $C_S$ and $C_{SP}$. The MOSFETs $Q_{1S}$, $Q_{2S}$ and $Q_{3S}$ have the same function and the same connection structure as the MOSFETs Q30, Q31 and Q52 shown in FIG. 21. Accordingly, in the case of the construction of the substrate bias potential generating circuit shown in FIG. 22, it is possible to set the substrate bias potential to −(Vcc−Vt) in the same manner as in the reference potential generating circuit shown in FIG. 21. In this case, the threshold voltage Vt is an absolute value of the threshold voltage of the p channel MOSFETs $Q_{2M}$ and $Q_{2S}$. Accordingly, by using this structure, it becomes possible to bias the semiconductor substrate deeper and to reduce the parasitic capacitance of the semiconductor memory device. Thus, the semiconductor memory device can be operated with high reliability at high speed.

In the above described embodiment, if the conductivity type of the MOSFETs included in the substrate bias potential generating circuit is opposite to that indicated above, the same effects can be obtained.

In addition, as shown in FIG. 8, switching of the substrate bias potential generating circuits is effected by using the NOR gate. However, a NAND gate may be used in place thereof. Similarly, although the construction using the NOR gate is shown as the flip-flop 120 shown in FIG. 18, other gate structure such as a NAND gate may be used in place thereof.

In addition, although the construction of the substrate bias potential generating circuits in the semiconductor memory device was described in the foregoing embodiments, a semiconductor integrated circuit device where a predetermined bias potential is generally applied to a semiconductor substrate may be used.

Furthermore, the semiconductor substrate may be a semiconductor layer or a well region having a surface where circuit elements are formed, insofar as predetermined bias potential can be applied thereto.

As described in the foregoing, according to the present invention, a substrate potential is detected by using a substrate bias potential detecting circuit having a high input impedance and the output of the detection and a reference potential are compared. According to the result of the comparison, only either one of the substrate bias potential generating circuits having different bias capabilities is selectively operated. Consequently, only either one of the two substrate bias potential generating circuits is operated constantly and thus a semiconductor integrated circuit device having low consumption of power can be provided. Particularly, since the substrate potential detecting circuit detects the potential of the semiconductor substrate through the input having a high input impedance, the potential of the semiconductor substrate can be detected reliably without exerting any adverse effect on the semiconductor substrate potential. In addition, since one of the substrate bias potential generating circuits is alternatively operated according to the detected substrate potential, either of the substrate bias potentials can be selectively applied with more accuracy according to the potential of the semiconductor substrate and thus a semiconductor integrated circuit device having less consumption of power can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A substrate bias potential generator of a semiconductor integrated circuit device, for applying a predetermined bias potential to a semiconductor substrate having a surface where a semiconductor circuit is formed, comprising:

first and second potential generating means having different current supply capabilities, outputs of said first and second potential generating means being applied to said semiconductor substrate, means coupled to said semiconductor substrate through an input having a high input impedance, for detecting a potential of said semiconductor substrate through said input, and means responsive to an output of said semiconductor substrate potential detecting means, for selectively activating either said first or second, not both, potential generating means, said selective activation means including
means for generating an activation signal,
means for generating a reference potential, and
comparing means for comparing the output of said substrate potential detecting means and the output of said reference potential generating means,
said comparing means including means for transmitting an output of said activation signal generating means to either said first or second potential generating means, thereby activating only one of said first and second potential generating means.

2. A substrate bias potential generator in accordance with claim 1, wherein
said transmitting means transmits said activation signal to a potential generating means having the larger current supply capability of said first and second potential generating means when the output of said comparing means indicates that an absolute value of the potential of said semiconductor substrate is smaller than an absolute value of said reference potential.

3. A substrate bias potential generator in accordance with claim 1, wherein
said activation signal is a signal of a sequence of pulses,
said substrate potential detecting means includes a first insulated gate field effect transistor having a gate electrode connected to said semiconductor substrate,
said comparing means includes
a first node connected to said first potential generating means,
a second node connected to said second potential generating means,
a second insulated gate field effect transistor having a gate electrode for receiving an output of said reference potential generating means,
differential amplifying means coupled to said first and second nodes, for differentially amplifying potentials at said first and second nodes,
means for activating said differential amplifying means in response to said activation signal, and
means for controlling connection/disconnection of said first and second nodes to or from said first and second insulated gate field effect transistors in response to said activation signal, said controlling means electrically separating said first and second nodes from said first and second insulated gate field effect transistors when said differential amplifying means is activated, and connecting said first and second nodes to said first and second insulated gate field effect transistors when said differential amplifying means is not activated.

4. A substrate bias potential generator in accordance with claim 3, wherein
said means for activating said differential amplifying means includes means for inverting said activation signal, and
said connection/disconnection control means includes means for delaying said activation signal by a predetermined time.

5. A substrate bias potential generator in accordance with claim 3, wherein
said differential amplifying means includes means to activated in response to said activation signal, for applying a potential of a predetermined level to both of said first and second nodes, and said predetermined potential level applying means is inactivated in response to activation of said differential amplifying means.

6. A substrate bias potential generator in accordance with claim 4, wherein
said delay means includes an inverter in cascade-connection with said means for inverting;

7. A substrate bias potential generator in accordance with claim 4, wherein
said delay means includes
buffer means provided between said first and second nodes and said first and second potential generating means, said buffer means including an inverter, and
flip-flop means to be set in response to said means for inverting and to be reset in response to an output of the inverter of said buffer means, for disabling said connection/disconnection means.

8. A substrate bias potential generator in accordance with claim 1, wherein
said reference potential generating means comprises
first capacitor means having a first electrode for receiving an inversion signal of said activation signal,
second capacitor means having a first electrode for receiving said activation signal,
a first insulated gate field effect transistor diode-connected and connected between a second electrode of said first capacitor means and said comparing means,
a second insulated gate field effect transistor connected between said second electrode of said first capacitor means and a predetermined potential and having a gate electrode connected to a second electrode of said second capacitor means, and
a third insulated gate field effect transistor diode-connected and provided between the second electrode of said second capacitor means and said predetermined potential.

9. A substrate bias potential generator in accordance with claim 1, wherein
said activation signal is a series of pulse signals
each of said first and second potential generating means comprises
first capacitor means having one electrode for receiving said output from said transmitting means and another electrode,
second capacitor means having one electrode for receiving an inversion signal of said output from said transmitting means and another electrode,
a first insulated gate field effect transistor diode-connected and provided between said other electrode of said first capacitor means and said semiconductor substrate, a second insulated gate field effect transistor diode-connected and provided between said other electrode of said second capacitor means and a predetermined potential, and a third insulated gate field effect transistor provided between said other electrode of said first capacitor means and said predetermined potential and having a gate electrode connected to said other electrode of said second capacitor means.

10. A substrate bias potential generator in accordance with claim 1, wherein said semiconductor circuit includes a semiconductor memory device and said substrate bias potential generator and said semiconductor memory device are integrated on said semiconductor substrate.

11. A substrate bias potential generator for applying a predetermined bias potential to a semiconductor substrate where a semiconductor memory device is formed, comprising:

first and second potential generating means having different current supply capabilities, circuit means for generating an activation signal for activating said first and second potential generating circuit means, said activation signal being a series of pulse signals, reference potential generating circuit means, and circuit means for comparing a potential of said semiconductor substrate and said reference potential and activating only either one of said first and second potential generating circuit means based on the result of the comparison, said comparing and activation circuit means including a first insulated gate field effect transistor having a gate electrode connected to said semiconductor substrate, one conduction electrode connected to a first power supply potential and another conduction electrode, a second insulated gate field effect transistor having a gate electrode for receiving an output of said reference potential generating circuit means, one electrode connected to said first power supply potential and another electrode, a first node for transmitting said activation signal to said first potential generating circuit means, a second node for transmitting said activation signal to said second potential generating circuit means, circuit means for delaying said activation signal, a circuit connected to said first and second nodes, for differentially amplifying potentials of said first and second nodes, inversion circuit means for inverting said activation signal and activating said differential amplification circuit means, third and fourth insulated gate field effect transistor responsive to an output of said delay circuit means, for connecting said first and second insulated gate field effect transistors to said first and second nodes, said third and fourth insulated gate field effect transistors connecting said first and second insulated gate field effect transistors to said first and second nodes when said differential amplification circuit means is inactivated, and separating said first and second nodes from said first and second insulated gate field effect transistors when said differential amplification circuit means is activated, and fifth and sixth insulated gate field effect transistors responsive to said activation signal, for setting said first and second nodes to said first power supply potential.

12. A method of applying to a semiconductor substrate a predetermined bias potential using first and second bias generating circuits having different current supply capabilities, said semiconductor substrate having a surface where a semiconductor circuit is formed, comprising the steps of:

generating a reference potential, detecting a potential of said semiconductor substrate using a detector having an input of high input impedance, said input of said detector being connected to said semiconductor substrate, comparing said detected potential of said substrate and said reference potential, and activating either one, not both, of said first and second bias potential generating circuits based on the result of the comparison.

13. A method in accordance with claim 12, wherein said comparing and activating steps include the steps of generating an activation signal, generating signals corresponding to said reference potential and said potential of said substrate in response to said activation signal, differentially amplifying said generated signals, and transmitting said activation signal to either one of said first and second bias generating circuits based on the result of the differential amplification.

14. A method in accordance with claim 12, wherein said comparing and activating steps include the steps of generating an activation signal in pulses, detecting said generated reference potential, transmitting said detected reference potential and said potential of said substrate to the first and second nodes, differentially amplifying potentials of said first and second nodes, stopping transmission of said reference potential and said potential of said substrate to said first and second nodes in response to said differential amplifying operation, setting a predetermined potential at said first and second nodes after completion of said differential amplifying operation, and applying the potentials of said first and second nodes to said first and second bias generating circuits.

15. A method of applying to a semiconductor substrate a bias potential using first and second bias generators have different current supply capabilities, comprising the steps of:

generating a reference potential;

detecting a potential of said semiconductor substrate;

comparing said reference potential and said detected potential of said semiconductor substrate; and, activating either one, but not both, of said first and second bias generators based on the result of the comparison.

16. A method of applying a predetermined bias potential to a semiconductor substrate containing a semiconductor circuit formed thereon, comprising the steps of:

generating a reference potential;

detecting a potential of said semiconductor substrate;
comparing the detected potential with said reference potential; and in response,
applying to said substrate, selectively, one or the other, but not both, of a first, relatively high magnitude source of current and a second, relatively low magnitude source of current to provide bias to said substrate.

17. A substrate bias potential generator of a semiconductor integrated circuit device, for applying a predetermined bias potential to a semiconductor, substrate having a surface where a semiconductor circuit is formed, comprising:

first potential generating means having relatively large current supply capability and an output coupled to said semiconductor substrate;

second potential generating means having relatively small current supply capability and an output coupled to said semiconductor substrate;

detection means having an input coupled to said semiconductor substrate, for detecting a potential of said semiconductor substrate through said input, said detection means having an output signal which is dependent upon the detected substrate potential; and means responsive to said output signal for selectively activating either said first or second, not both, potential generating means.

* * * * *